US012800804B2

(12) United States Patent
Fukuda et al.

(10) Patent No.: US 12,800,804 B2
(45) Date of Patent: Nov. 17, 2026

(54) LIGHT DIFFUSION SHEET, BACKLIGHT UNIT, LIQUID CRYSTAL DISPLAY DEVICE, AND INFORMATION DEVICE

(71) Applicant: KEIWA Inc., Tokyo (JP)

(72) Inventors: Tadayoshi Fukuda, Tokyo (JP); Kenichi Harada, Tokyo (JP)

(73) Assignee: KEIWA Incorporated, Tokyo (JP)

( * ) Notice: Subject to any disclaimer, the term of this patent is extended or adjusted under 35 U.S.C. 154(b) by 352 days.

(21) Appl. No.: 18/517,724

(22) Filed: Nov. 22, 2023

(65) Prior Publication Data

US 2024/0094446 A1 Mar. 21, 2024

Related U.S. Application Data

(63) Continuation of application No. PCT/JP2022/021076, filed on May 23, 2022.

(30) Foreign Application Priority Data

May 26, 2021 (JP) ................................ 2021-088425
May 19, 2022 (JP) ................................ 2022-082230

(51) Int. Cl.
*G02B 5/02* (2006.01)
*G02F 1/1335* (2006.01)
*G02F 1/13357* (2006.01)

(52) U.S. Cl.
CPC ......... *G02B 5/0231* (2013.01); *G02B 5/0215* (2013.01); *G02F 1/133504* (2013.01); *G02F 1/133605* (2013.01)

(58) Field of Classification Search
CPC ............................ G02B 5/0231; G02B 5/0215
See application file for complete search history.

(56) References Cited

U.S. PATENT DOCUMENTS

| | | | | |
|---|---|---|---|---|
| 11,131,799 | B2 * | 9/2021 | Namikawa | G02B 6/0051 |
| 12,135,479 | B2 * | 11/2024 | Tsai | G02F 1/1336 |
| 2008/0130117 | A1 | 6/2008 | Hsu et al. | |
| 2017/0329066 | A1 * | 11/2017 | Harada | G02B 5/0294 |
| 2017/0357047 | A1 * | 12/2017 | Harada | G02B 6/0053 |
| 2018/0180794 | A1 * | 6/2018 | Harada | G02B 5/0221 |
| 2020/0292881 | A1 | 9/2020 | Tsai et al. | |
| 2020/0341335 | A1 | 10/2020 | Tsai et al. | |
| 2021/0072598 | A1 | 3/2021 | Walker et al. | |

(Continued)

FOREIGN PATENT DOCUMENTS

| | | |
|---|---|---|
| CN | 101191847 | 6/2008 |
| CN | 110320580 | 10/2019 |
| JP | 2008-139878 A | 6/2008 |

(Continued)

OTHER PUBLICATIONS

International Search Report and Written Opinion for PCT/JP2022/021076 (ISA/JP) mailed Jul. 12, 2022 w/English translation (15 pages).

*Primary Examiner* — Leah Macchiarolo
(74) *Attorney, Agent, or Firm* — JCIPRNET

(57) ABSTRACT

A plurality of recesses 105 having a substantially inverted quadrangular pyramid shape are provided on a first surface 43*a* of a light diffusion sheet 43. A plurality of linear structures 106 extending in a predetermined direction are provided on a second surface 43*b* of the light diffusion sheet 43. An apex angle of the plurality of recesses 105 is 100° or more.

26 Claims, 13 Drawing Sheets

(56) References Cited

U.S. PATENT DOCUMENTS

| | | | |
|---|---|---|---|
| 2022/0004058 | A1 | 1/2022 | Tsai et al. |
| 2022/0326571 | A1 | 10/2022 | Tsai et al. |

FOREIGN PATENT DOCUMENTS

| | | | |
|---|---|---|---|
| JP | 2013-214378 | A | 10/2013 |
| JP | 2020-079920 | A | 5/2020 |
| JP | 2020-086432 | A | 6/2020 |
| WO | WO 2010/010840 | A1 | 1/2010 |

* cited by examiner

LIGHT DIFFUSION SHEET, BACKLIGHT UNIT, LIQUID CRYSTAL DISPLAY DEVICE, AND INFORMATION DEVICE

CROSS REFERENCE TO RELATED APPLICATIONS

This application is a bypass continuation of International Application No. PCT/JP2022/021076, filed May 23, 2022, which international application claims priority to and the benefit of Japanese Application No. 2021-088425, filed May 26, 2021, and Japanese Application No. 2022-082230, filed May 19, 2022; the contents of all of which as are hereby incorporated by reference herein in their respective entireties.

TECHNICAL FIELD

The present disclosure relates to a light diffusion sheet, a backlight unit, a liquid crystal display device, and an information device.

BACKGROUND ART

In recent years, liquid crystal display devices (hereinafter also referred to as liquid crystal displays) have been widely used as display devices for various information devices such as smartphones and tablet terminals. A backlight of a liquid crystal display is mostly of a direct type in which light sources are arranged on the back surface of a liquid crystal panel, or of an edge light type in which light sources are arranged near a side surface of the liquid crystal panel.

When the direct-type backlight is adopted, a light diffusion sheet is used in order to diffuse light emitted from a light source such as a light emitting diode (LED) to improve uniformity of luminance and chromaticity over the entire screen (e.g., see Patent Document 1).

A light diffusion sheet diffuses light incident from a light incident surface by forming an uneven shape on a light emitting surface to cause diffusion or by dispersing fine particles having a refractive index different from that of a sheet base material in the sheet base material. Further, to improve uniformity of luminance in a screen (in-plane luminance uniformity), a plurality of light diffusion sheets may be layered and used.

Patent Document 1 discloses a light diffusion sheet in which a plurality of quadrangular pyramids are formed on one surface and a plurality of parallel linear prisms are formed on the other surface.

CITATION LIST

Patent Document

Patent Document 1: U.S. Patent Application Publication No. 2021/0072598A1.

SUMMARY OF THE INVENTION

Technical Problem

For a backlight of a liquid crystal display, there has been a demand for reduction in the thickness of the light diffusion sheet and reduction in the number of layers in the light diffusion sheet, with a demand for reduction in the thickness of a display. Further, since the direct-type backlight has light sources arranged directly below the display screen, reduction in the distance between the light sources and the light diffusion sheet is also required. Therefore, it is necessary to improve a luminance uniformity capability per light diffusion sheet in order to maintain the in-plane luminance uniformity even for thinner devices.

An object of the present disclosure is to provide a light diffusion sheet with high luminance uniformity capability.

Solution to the Problem

To achieve the above-described object, a light diffusion sheet of the present disclosure is a light diffusion sheet including a first surface to serve as a light emitting surface and a second surface to serve as a light incident surface. A plurality of recesses having a substantially inverted quadrangular pyramid shape are provided on one of the first surface and the second surface. A plurality of linear structures extending in a predetermined direction are provided on another one of the first surface and the second surface. An apex angle of the plurality of recesses is 100° or more.

The light diffusion sheet of the present disclosure includes a plurality of recesses having a substantially inverted quadrangular pyramid shape on one surface, and a plurality of linear structures extending in a predetermined direction on the other surface, and the recesses have an apex angle of 100° or more. Therefore, the synergistic effect of the light diffusing effect by the plurality of recesses and the light diffusing effect by the plurality of linear structures can be increased. This enables improvement of the luminance uniformity capability per light diffusion sheet, and hence it is possible to cope with reduction of the thickness or the number of layers of the light diffusion sheet accompanied by further flattening.

In the present disclosure, the "light diffusion sheet" encompasses a plate-like "light diffusion plate" and a film-like "light diffusion film."

In the light diffusion sheet of the present disclosure, the plurality of linear structures may constitute a prism, a hairline, a lenticular, or a diffractive grating. This in combination with the recesses having a substantially inverted quadrangular pyramid shape can reliably increase the synergistic effects of the light diffusing effect.

In the light diffusion sheet of the present disclosure, the plurality of linear structures may constitute a prism with an apex angle of 95° or less; and the apex angle of the plurality of recesses is 110° or more and 130° or less. Accordingly, the synergistic effect of the light diffusing effect by the plurality of recesses and the light diffusing effect by the plurality of linear structures can be particularly increased.

In the light diffusion sheet of the present disclosure, the plurality of linear structures may constitute a prism, and the apex angle of the plurality of recesses may be 130° or more and 150° or less. This increases the luminance while improving the luminance uniformity capability.

In the light diffusion sheet of the present disclosure, the plurality of recesses are arrayed in a two-dimensional matrix, and the array direction may cross the predetermined direction (the direction in which the plurality of linear structures extend). Accordingly, the synergistic effects of the light diffusing effect can be increased over a broader range of the apex angle of the recesses.

Another aspect of the light diffusion sheet of the present disclosure is directed to a light diffusion sheet including a first surface to serve as a light emitting surface and a second surface to serve as a light incident surface. A plurality of recesses having a substantially inverted quadrangular pyramid shape are provided on one of the first surface and the second surface. A plurality of linear structures extending in a predetermined direction are provided on another one of the first surface and the second surface. The plurality of linear structures constitute a prism with an apex angle of 95° or more, and the apex angle of the plurality of recesses is 85° or more and 95° or less.

The other aspect of the light diffusion sheet of the present disclosure includes a plurality of recesses having a substantially inverted quadrangular pyramid shape on one surface, and a plurality of linear structures extending in a predetermined direction on the other surface. Each of the linear structures constitutes a prism having an apex angle of 95° or more, and the recesses have an apex angle of 85° or more and 95° or less. Therefore, the synergistic effect of the light diffusing effect by the plurality of recesses and the light diffusing effect by the plurality of linear structures can be increased. This enables improvement of the luminance uniformity capability per light diffusion sheet, and hence it is possible to cope with reduction of the thickness or the number of layers of the light diffusion sheet accompanied by further flattening.

A backlight unit of the present disclosure is a backlight unit built in a liquid crystal display device, which leads light emitted from a plurality of light sources toward a display screen. The backlight unit includes the above-described light diffusion sheet of the present disclosure (including the other aspect. The same applies hereinafter) between the display screen and the plurality of light sources.

Since the backlight unit of the present disclosure includes the above-described light diffusion sheet of the present disclosure, the luminance uniformity capability per light diffusion sheet can be improved. Hence it is possible to cope with reduction of the thickness or the number of layers of the light diffusion sheet accompanied by further flattening.

In the backlight unit of the present disclosure, the plurality of light sources may be arranged on a reflective sheet provided opposite to the display screen when viewed from the light diffusion sheet. This causes multiple reflections between the light diffusion sheet and the reflective sheet thus causing further diffusion of light rays, and hence the in-plane luminance uniformity is further improved.

In the backlight unit of the present disclosure, the light diffusion sheet may include a plurality of light diffusion sheets layered and arranged between the display screen and the plurality of light sources. Accordingly, the in-plane luminance uniformity can be further improved with the plurality of light diffusion sheets. In this case, the light diffusion sheet having the plurality of layers may include a first light diffusion sheet and a second light diffusion sheet, and the direction in which the plurality of linear structures on the first light diffusion sheet extend may cross the direction in which the plurality of linear structures on the second light diffusion sheet extend. Accordingly, generation of moire (interference fringes) can be reduced.

The backlight unit of the present disclosure may further include another light diffusion sheet between the display screen and the light diffusion sheet. A plurality of other recesses having a substantially inverted quadrangular pyramid may be provided on one surface of the other light diffusion sheet, and the apex angle of the plurality of the other recesses may be smaller than the apex angle of the plurality of recesses. Accordingly, the in-plane luminance uniformity can be improved while the luminance can be increased, in a backlight unit using a combination of light diffusion sheets having different configurations.

In the backlight unit of the present disclosure, a distance between the plurality of light sources and the light diffusion sheet may be 0 mm or more 1 mm or less. Accordingly, even if a sufficient distance between the light sources and the sheet cannot be ensured due to flattening, deterioration in the in-plane luminance uniformity can be alleviated with the diffusion performance of the above-described light diffusion sheet of the present disclosure.

A liquid crystal display device of the present disclosure includes the above-described backlight unit of the present disclosure and a liquid crystal display panel.

The liquid crystal display device of the present disclosure includes the above-described backlight unit of the present disclosure. Thus, the in-plane luminance uniformity can be maintained even for reduction in the thickness or the number of layers of the light diffusion sheet, accompanied by further flattening.

An information device of the present disclosure includes the above-described liquid crystal display device of the present disclosure.

An information device of the present disclosure includes the above described liquid crystal display device of the present disclosure. Thus, the in-plane luminance uniformity can be maintained even for further flattening.

Advantages of the Invention

With the present disclosure, a light diffusion sheet with a high luminance uniformity capability, as well as a backlight unit, a liquid crystal display device, and information device using such a light diffusion sheet can be provided.

BRIEF DESCRIPTION OF THE DRAWINGS

FIG. 6 shows a relationship between an array direction of the recesses and an extending direction of linear structure in the light diffusion sheet according to the embodiment, where

FIG. 7 is a cross-sectional view showing variations of the linear structure provided on another side of the light diffusion sheet according to the embodiment, where

DESCRIPTION OF EMBODIMENT

Embodiment

With reference to the drawings, the following describes a light diffusion sheet, a backlight unit, a liquid crystal display device, and an information device of an embodiment. Note that the scope of the present disclosure is not limited to the following embodiments, and may be altered in any way within the scope of the technical concept of the present disclosure.

<Liquid Crystal Display Device>

Figure 1:
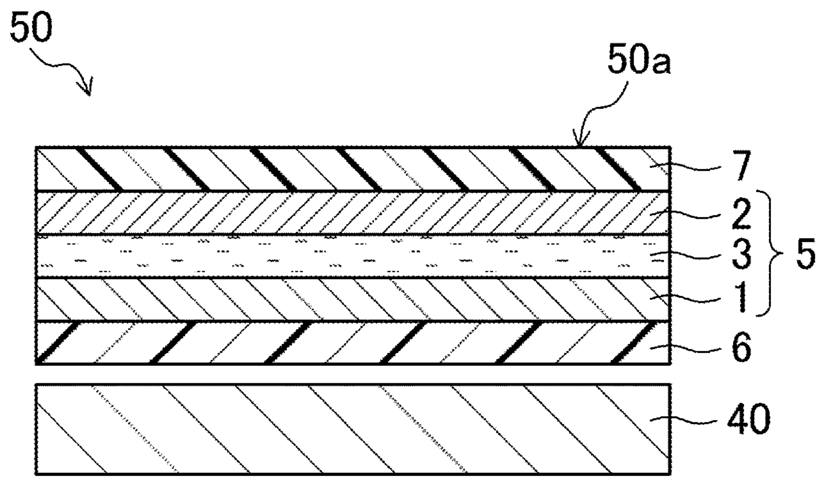
FIG. 1 is a cross-sectional view of a liquid crystal display device of an embodiment.

FIG. 1 is an exemplary cross-sectional view of a liquid crystal display device of the present embodiment.

As shown in FIG. 1, a liquid crystal display device 50 includes a liquid crystal display panel 5, a first polarizing plate 6 attached to a lower surface of the liquid crystal display panel 5, a second polarizing plate 7 attached to an upper surface of the liquid crystal display panel 5, and a backlight unit 40 provided on a back surface side of the liquid crystal display panel 5 with the first polarizing plate 6 interposed. The liquid crystal display panel 5 includes a TFT substrate 1 and a CF substrate 2 provided so as to face each other, a liquid crystal layer 3 provided between the TFT substrate 1 and the CF substrate 2, and a sealing (not shown) provided in a frame shape to seal the liquid crystal layer 3 between the TFT substrate 1 and the CF substrate 2.

The shape of a display screen 50*a* of the liquid crystal display device 50 viewed from the front (the top in FIG. 1) is basically a rectangle or a square. Alternatively, the shape may be any shape, such as a rectangle with rounded corners, an oval, a circle, a trapezoid, or a shape of an instrument panel of an automobile.

The liquid crystal display device 50 applies a voltage of a predetermined magnitude to the liquid crystal layer 3 in sub-pixels corresponding to pixel electrodes, thereby changing the alignment state of the liquid crystal layer 3. This adjusts the transmittance of light incident from the backlight unit 40 through the first polarizing plate 6. The light whose transmittance is adjusted is emitted through the second polarizing plate 7 to display an image.

The liquid crystal display device 50 of the present embodiment is used as a display device incorporated in various information devices (e.g., an in-vehicle device such as a car navigation system, a personal computer, a mobile phone, a portable information terminal, a portable game machine, a copying machine, a ticket vending machine, an automated teller machine, and the like).

The TFT substrate 1 includes, for example, a plurality of TFTs arranged in a matrix on a glass substrate, an interlayer insulating film arranged in such a manner as to cover the TFTs, a plurality of pixel electrodes arranged in a matrix on the interlayer insulating film and connected to the TFTs, respectively, and an alignment film arranged in such a manner as to cover the pixel electrodes. The CF substrate 2 includes, for example, a black matrix arranged in a lattice manner on a glass substrate, a color filter including a red layer, a green layer, and a blue layer arranged between each lattice of the black matrix, a common electrode arranged in such a manner as to cover the black matrix and the color filter, and an alignment film arranged in such a manner as to cover the common electrode. The liquid crystal layer 3 is made of, for example, a nematic liquid crystal material containing liquid crystal molecules having electro-optical characteristics. The first polarizing plate 6 and the second polarizing plate 7 each include, for example, a polarizer layer having a polarization axis in one direction, and a pair of protective layers arranged in such a manner as to sandwich the polarizer layer.

<Backlight Unit>

Figure 2:
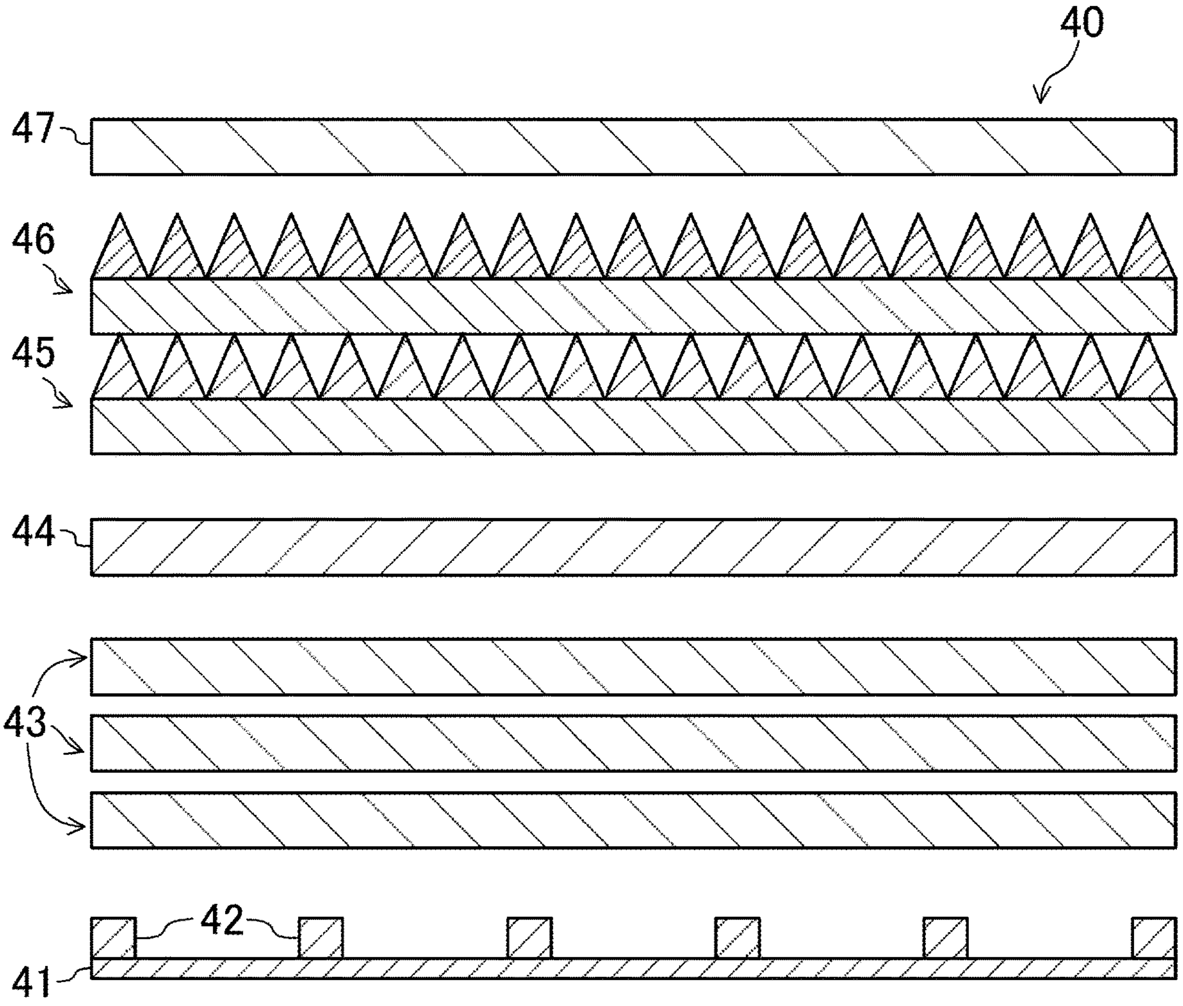
FIG. 2 is a cross-sectional view of a backlight unit of the embodiment.

FIG. 2 is an exemplary cross-sectional view of the backlight unit of the present embodiment.

The backlight unit 40 includes, as shown in FIG. 2, a reflective sheet 41, a plurality of light sources 42 arranged in a two-dimensional pattern on the reflective sheet 41, light diffusion sheets (lower light diffusion sheets) 43 provided above the plurality of light sources 42, a color conversion sheet 44 provided above the light diffusion sheets 43, a first prism sheet 45 and a second prism sheet 46 provided in order above the color conversion sheet 44, and a light diffusion sheet (upper light diffusion sheet) 47 provided above the second prism sheet 46.

Although FIG. 2 illustrates that three light diffusion sheets 43 each having the same configuration are layered in the backlight unit 40, the number of light diffusion sheets 43 may be one, two, four or more.

The reflective sheet 41 is formed of, for example, a white polyethylene terephthalate resin film, a silver-deposited film, or the like.

The type of the light sources 42 is not particularly limited. For example, an LED element, a laser element, or the like may be adopted, and an LED element may be adopted for the sake of costs, productivity, and the like. Each of the light sources 42 may have a rectangular shape in a plan view, where each side may be 10 μm or more (preferably 50 μm or more) and 20 mm or less (preferably 10 mm or less, more preferably 5 mm or less). If an LED is used as each of the light sources 42, a plurality of LED chips each having a size of several mm square may be arranged on the reflective sheet 41 at regular intervals. To adjust a light emission angle characteristics of each LED to serve as the light source 42, a lens may be attached to the LED. The number of the light sources 42 is not limited. To be distributed, the plurality of light sources 42 may be arranged regularly on the reflective sheet 41 in one preferred embodiment. The "arranged regularly" means arrangement with a certain regularity. Examples include the case where the light sources 42 are arranged at equal intervals. If the light sources 42 are arranged at equal intervals, the distance between the centers of two adjacent light sources 42 may be 0.5 mm or more (2 mm or more in one preferred embodiment) and 20 mm or less.

The light diffusion sheets (lower light diffusion sheets) 43 focus light rays incident from the light sources 42 in the normal direction while defusing the light rays (that is, the light diffusion sheets 43 focus and diffuse the light rays). A matrix resin constituting the light diffusion sheets 43 is not particularly limited, as long as it is a material that transmits light. Examples may include polycarbonate, acrylic, polystyrene, methyl methacrylate-styrene copolymer resin (MS resin), polyethylene terephthalate, polyethylene naphthalate, cellulose acetate, and polyimide. The thickness of each light diffusion sheet 43 is not limited, but may be, for example, 50 μm or more and 3 mm or less. The light diffusion sheet 43 with a thickness larger than 3 mm makes it difficult to achieve a reduction in the thickness of the liquid crystal display. The light diffusion sheet 43 with a thickness less than 50 μm makes it difficult to obtain sufficient light diffusing effect. As shown in FIG. 2, when a plurality of light diffusion sheets 43 each having the same configuration are layered, the thickness of the layers may be approximately several hundreds μm to several mm. Each light diffusion sheet 43 may have a film shape or a plate shape. The detailed configuration and manufacturing method of the light diffusion sheet 43 will be described later.

The color conversion sheet 44 is a wavelength conversion sheet for converting light (e.g., blue light) emitted from the light source 42 into light having a wavelength of a certain color (e.g., green or red) as a peak wavelength. The color conversion sheet 44 converts, for example, blue light with a wavelength of 450 nm into green light with a wavelength of 540 nm and red light with a wavelength of 650 nm. In this case, when the light source 42 emitting blue light with a wavelength of 450 nm is used, the blue light is partially converted into green and red light through the color conversion sheet 44, and the light transmitted through the color conversion sheet 44 becomes white light. For example, the color conversion sheet 44 may be a QD (quantum dot) sheet or the like.

The first prism sheet 45 and the second prism sheet 46 refract light rays incident from the color conversion sheet 44 in the normal direction. On the light emitting surfaces of the prism sheets 45 and 46, for example, a plurality of grooves each having an isosceles triangular transversal cross-section are provided adjacent to one another, and a triangular prism part sandwiched between a pair of grooves adjacent to each other constitute a prism. The apex angle of the prism is, for example, about 90°. The grooves formed on the first prism sheet 45 and the grooves formed on the second prism sheet 46 may be arranged so that each groove on the first prism sheet 44 and each groove on the second prism sheet 45 are perpendicular to each other. Accordingly, light rays incident from the color conversion sheet 44 can be refracted in the normal direction by the first prism sheet 45, and light rays emitted from the first prism sheet 45 can be further refracted by the second prism sheet 46 in a direction substantially perpendicular to the light incident surface of the light diffusion sheet 47. The prism sheets 45 and 46 may be layered as separate sheets, or may be integrally formed. The total thickness of the prism sheets 45 and 46 may be, for example, about 100 to 400 μm. The prism sheets 45 and 46 may be, for example, made of polyethylene terephthalate (PET) film with a prism shape formed by using UV-curable acrylic resin.

The light diffusion sheet (upper light diffusion sheet) 47 slightly diffuses light rays incident from the second prism sheet 46, so as to reduce luminance unevenness attributed to the shape of the prism parts of the prism sheets 45 and 46 or the like. The light diffusion sheet 47 may be directly layered on the surface of the prism sheet 46. The thickness of the light diffusion sheet 47 is not limited, but may be, for example, 50 μm or more and 3 mm or less. The light diffusion sheet 47 with a thickness larger than 3 mm makes it difficult to achieve a reduction in the thickness of the liquid crystal display. The light diffusion sheet 47 with a thickness less than 50 μm makes it difficult to obtain sufficient light diffusing effect. The light diffusion sheet 47 may have a film shape or a plate shape. The light diffusion sheet 47 may be, for example, made of a PET film having an uneven shape formed on at least one surface thereof using a UV-curable acrylic resin.

<Detailed Configuration of Light Diffusion Sheet (Lower Light Diffusion Sheet)>

Figure 3:
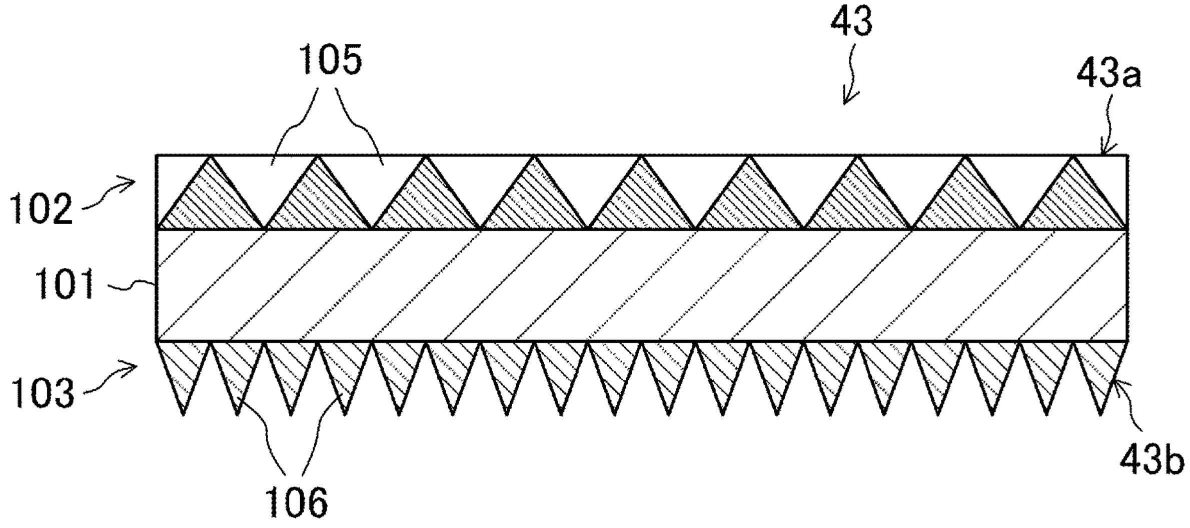
FIG. 3 is a cross-sectional view of a light diffusion sheet of the embodiment.
Figure 4:
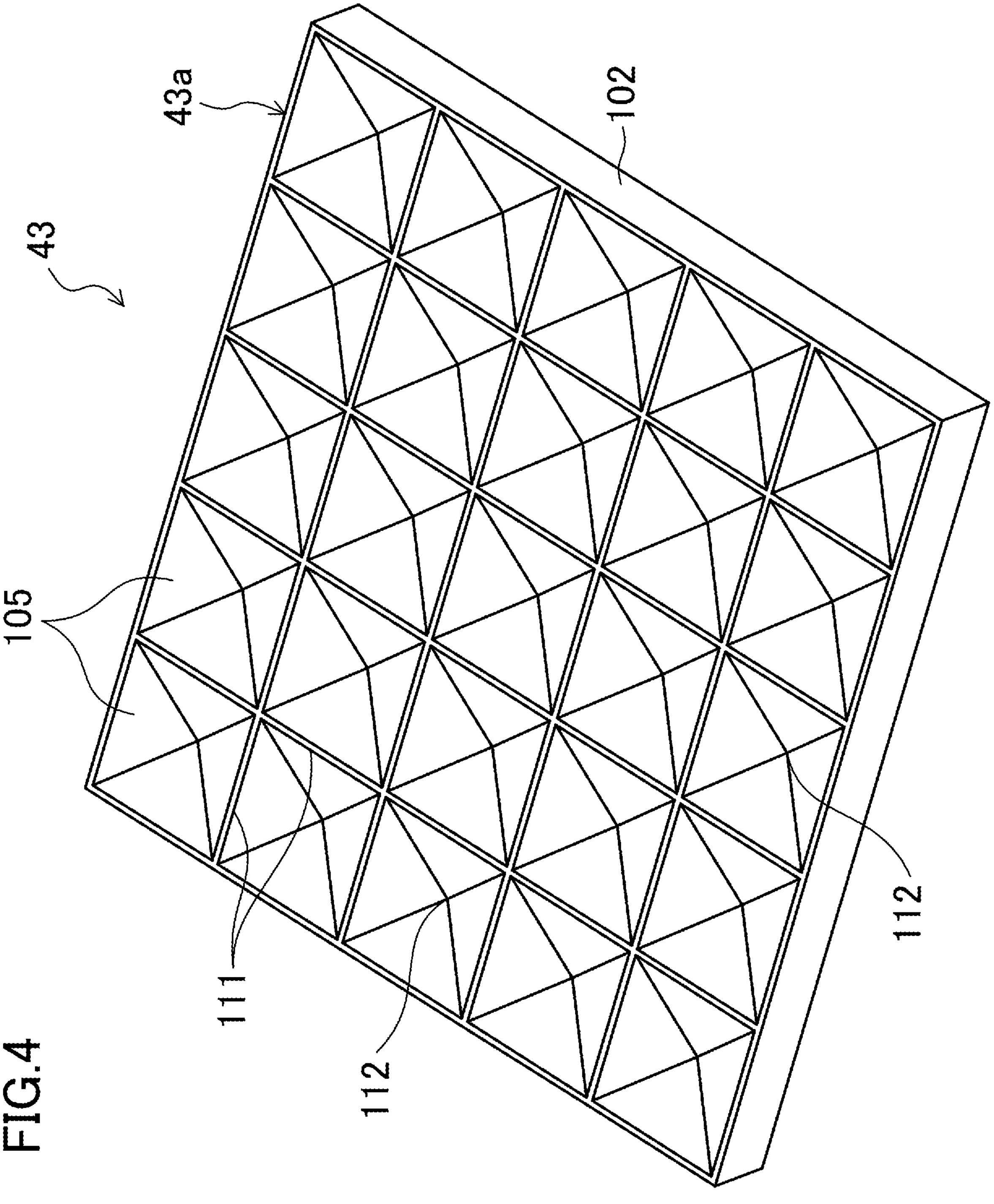
FIG. 4 is a perspective view of a light diffusion sheet of the embodiment.

FIG. 3 and FIG. 4 are a cross-sectional view and a perspective view of a light diffusion sheet of the present embodiment, respectively.

As shown in FIG. 3, the light diffusion sheet 43 has a first surface **43*a* to serve as a light emitting surface and a second surface 43*b* to serve as a light incident surface. That is, the light diffusion sheet 43 is arranged so that the second surface 43*b* faces the light sources 42. The light diffusion sheet 43 includes a base material layer 101, a first diffusion layer 102 provided on the first surface 43*a* of the base material layer 101, and a second diffusion layer 103 provided on the second surface 43*b* of the base material layer 101. The first diffusion layer 102 has a plurality of recesses 105 having a substantially inverted polygonal pyramid shape, specifically a substantially inverted quadrangular pyramid shape (inverted pyramid shape). The second diffusion layer 103 has a plurality of linear structures 106** extending in a predetermined direction.

In the present embodiment, the first surface **43*a* on which the first diffusion layer 102 is formed serves as the light emitting surface, and the second surface 43*b* on which the second diffusion layer 103 is formed serves as the light incident surface. Alternatively, the first surface 43*a* may serve as the light incident surface, and the second surface 43*b*** may serve as the light emitting surface.

Since the light rays need to pass through the base material layer 101, the base material layer 101 is formed mainly of a transparent (e.g., colorless and transparent) synthetic resin. The main component of the base material layer 101 is not particularly limited, and may be, for example, polycarbonate, polyethylene terephthalate, polyethylene naphthalate, an acrylic resin, polystyrene, polyolefin, cellulose acetate, and weather-resistant vinyl chloride. The term "main component" refers to the component with the highest content, e.g., 50% or more by mass. The base material layer 101 may contain a diffusing agent or other additives, or may be substantially free of additives. The additives that can be contained are not particularly limited, but examples of the additives include, for example, silica, titanium oxide, aluminum hydroxide, and barium sulfate as inorganic particles, as well as acrylic, acrylonitrile, silicone, polystyrene, and polyamide as organic particles.

The lower limit of the average thickness of the base material layer 101 is preferably about 10 μm, more preferably about 35 μm, and still more preferably about 50 μm. The upper limit of the average thickness of the base material layer 101 is preferably about 500 μm, more preferably about 250 μm, and still more preferably about 180 μm. If the average thickness of the base material layer 101 is less than the lower limit, curling may occur when the diffusion layers 102 and 103 are formed. On the other hand, if the average thickness of the base material layer 101 is more than the upper limit, the liquid crystal display device 50 may has a lower luminance, and the liquid crystal display device 50 may fail to have a necessary thinner thickness. The "average thickness" refers to an average value of thicknesses at any 10 points.

Since the light rays need to pass through the first diffusion layer 102, the first diffusion layer 102 is formed mainly of a transparent (e.g., colorless and transparent) synthetic resin. For example, the first diffusion layer 102 may be integrally formed with the base material layer 101 at the time of extrusion molding of the base material resin that becomes the base material layer 101, or may be separately formed by using an ultraviolet curable resin after forming of the base material layer 101.

The plurality of recesses 105 having a substantially inverted quadrangular pyramid shape (inverted pyramid shape) provided in the first diffusion layer 102 (the first surface 43*a* of the light diffusion sheet 43) may be arranged in a two-dimensional matrix as illustrated in FIG. 4, for example. In other words, the plurality of recesses 105 may be arranged along two directions perpendicular to each other. The recesses 105 adjacent to each other are parted by a ridge 111. The ridge 111 extends along the two directions in which the recesses 105 are arrayed. The arrangement pitch of the array of recesses 105 may be, for example, about 50 μm or more and about 500 μm or less. A center (apex of the inverted pyramid) 112 of each recess 105 is a deepest portion of the recess 105. The center (deepest part) 112 of the recess 105 may reach the surface (light emitting surface) of the base material layer 101. In other words, the depth of the recess 105 may be equal to the thickness of the first diffusion layer 102. Although FIG. 4 illustrates that the recesses 105 are arranged in a 5×5 matrix for simplicity, the actual number of the recesses 105 is much larger.

Figure 5:
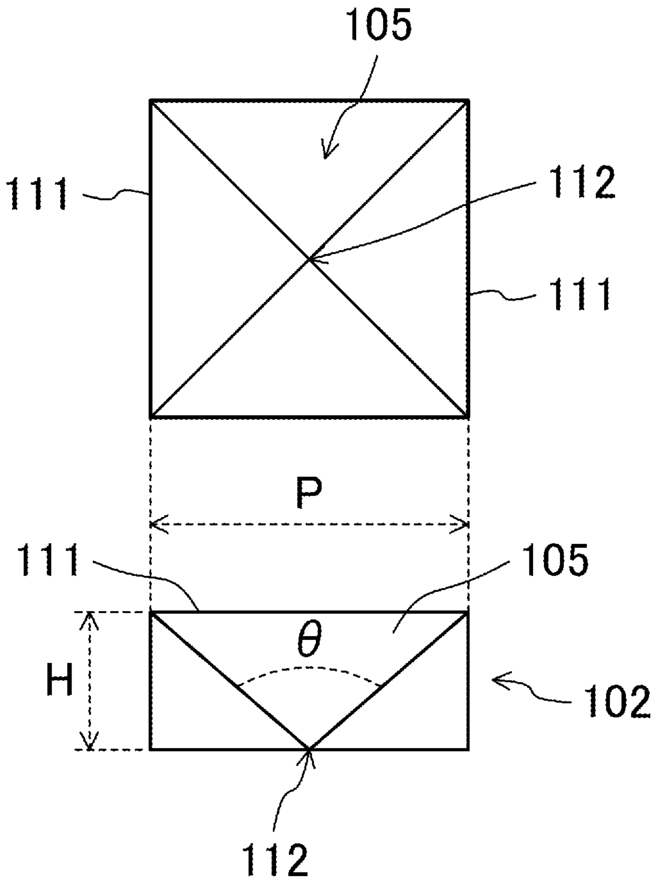
FIG. 5 shows a planer configuration and a cross-sectional configuration of recesses having a substantially inverted quadrangular pyramid shape which are provided throughout one surface of the light diffusion sheet according to the embodiment.

One of the features of the present embodiment is that the apex angle θ of the recess 105 is set to 100° or more. The upper limit of apex angle θ of the recess 105 may be set to, for example, 170° to reduce a decrease in the light diffusivity caused by the first diffusion layer 102. Here, the apex angle θ of the recess 105 is an angle formed by inclined surfaces of the recess 105, in a cross-section (lower part of FIG. 5) that appears when the recess 105 is cut by a surface (longitudinal cross-section) vertical to a surface (horizontal surface) on which the light diffusion sheet 43 is placed, such that the surface (longitudinal cross-section) passes through the apex 112 and vertically traverses a pair of ridges 111 facing each other with the apex 112 of the inverted pyramid in between, as shown in FIG. 5. The upper part of FIG. 5 shows the planar configuration of the recess 105. Further, in FIG. 5, the reference character “H” represents the depth of the recess 105 (the height of the pyramid shape), and the reference character “P” represents the horizontal width of the recess 105 (that is, the arrangement pitch of the recesses 105). The depth H of the recess 105 is determined by the arrangement pitch P of the recess 105 and the apex angle θ of the recess 105.

In the present embodiment, the recesses 105 having an inverted pyramid shape (substantially inverted quadrangular pyramid shape) are arranged in a two-dimensional matrix to provide an uneven shape. Alternatively, the recesses 105 may be arrayed randomly so that the advantages of the present invention are not lost. When the recesses 105 are regularly arranged two-dimensionally, a gap may be or may not be provided between the recesses 105. The recess 105 may have a substantially inverted polygonal pyramid shape other than the substantially inverted quadrangular pyramid shape. For example, the “inverted polygonal pyramid” shape of the recess 105 may be an inverted triangular pyramid or an inverted hexagonal pyramid which can be two-dimensionally arranged without a gap as the inverted quadrangular pyramid is. When the shape of the “inverted polygonal pyramid” of the recess 105 is an inverted quadrangular pyramid, the accuracy of cutting the surface of dies (metal rolls) used in a manufacturing process such as extrusion molding or injection molding at the time of forming the recesses 105 can be easily improved.

In the present disclosure, the term “substantially inverted polygonal pyramid” is used in consideration of difficulty in formation of a recess having a geometrically exact inverted polygonal pyramid shape by an ordinary shape transfer technique. However, the “substantially inverted polygonal pyramid” encompasses shapes that can be regarded as a true or almost true inverted polygonal pyramid. Here, “substantial(ly)” XX means that shapes can be approximated to the XX. For example, “substantially inverted quadrangular pyramids” means that shapes can be approximated to the inverted quadrangular pyramids. For example, the “substantially inverted polygonal pyramid” includes an “inverted truncated polygonal pyramid” of which the area of the apex is so small that the advantages of the present invention are not lost. The “substantially inverted polygonal pyramid” also includes a deformation of “inverted polygonal pyramid” with unavoidable shape variations due to the processing accuracy of industrial production.

Since the light rays need to pass through the second diffusion layer 103, the second diffusion layer 103 is formed mainly of a transparent (e.g., colorless and transparent) synthetic resin. For example, the second diffusion layer 103 may be integrally formed with the base material layer 101 at the time of extrusion molding of the base material resin that becomes the base material layer 101, or may be separately formed by using an ultraviolet curable resin after forming of the base material layer 101.

The linear structures 106 provided on the second diffusion layer 103 (the second surface 43*b* of the light diffusion sheet 43) so as to extend in the predetermined direction may be, for example, stripe-shaped prisms (triangular prisms). The lower limit of the thickness of the second diffusion layer 103 (the height from the surface (light incident surface) of the base material layer 101 to the apex of the prism serving as the linear structure 106) may be, for example, about 5 μm, and more preferably about 10 μm. The upper limit of the thickness of the second diffusion layer 103 may be, for example, about 200 μm, and more preferably about 100 μm. The lower limit of the pitch of the linear structures 106 may be, for example, about 10 μm, and more preferably about 20 μm. The upper limit of the pitch of the linear structures 106 may be, for example, about 200 μm, and more preferably about 100 μm. The lower limit of the refractive index of the prism serving as the linear structure 106 may be, for example, 1.5, more preferably 1.55; and the upper limit of the refractive index may be, for example, 1.7.

Figure 6B:
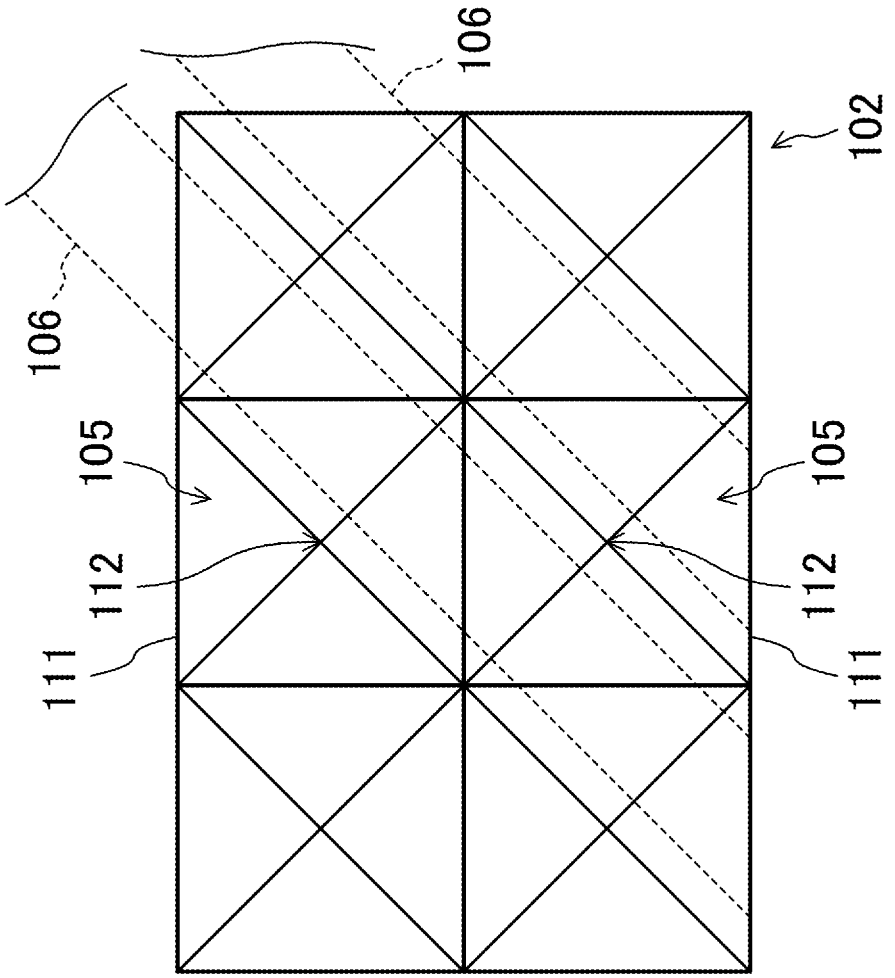
FIG. 6A shows that the directions match with each other and FIG. 6B shows that the directions cross each other at an angle of 45°.
Figure 6A:
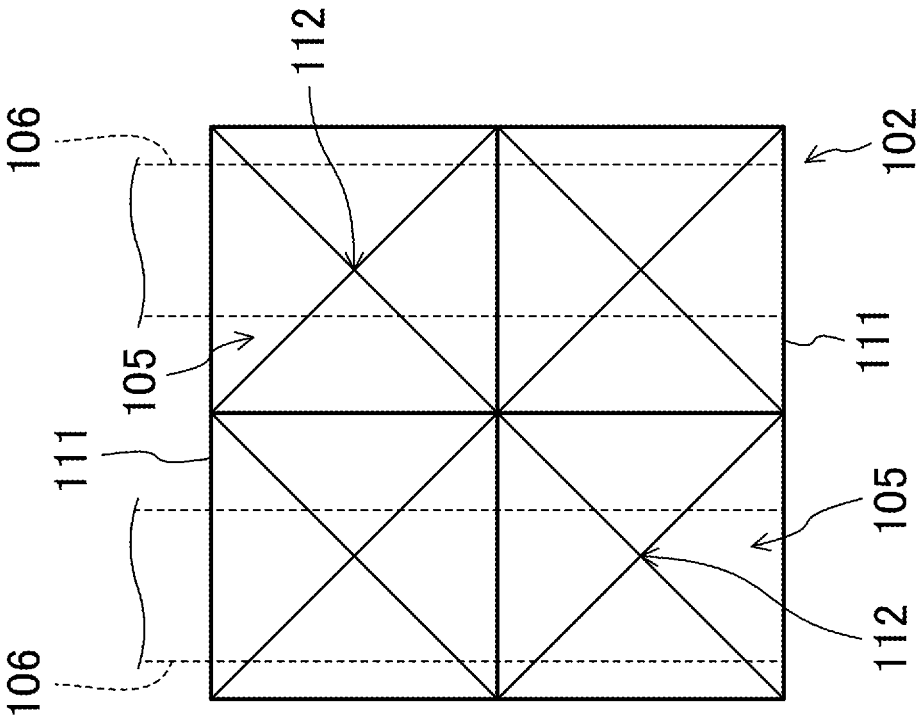

As shown in FIG. 6, when the plurality of recesses 105 are arranged in a two-dimensional matrix, the linear structures 106 may extend along one of the arraying directions of the recesses 105 (that is, in the extending directions of the ridges 111) (see FIG. 6A), or the arraying direction of the recesses 105 may cross the extending direction of the linear structures 106 (see FIG. 6B). When the arraying direction of the recesses 105 crosses the extending direction of the linear structures 106, the crossing angle may be, for example, 30° or more and 60° or less, preferably 40° or more and 50° or less. FIG. 6 is a partial plan view of the light diffusion sheet 43 viewed from the recesses 105 (first diffusion layer 102) side.

When a plurality of light diffusion sheets 43 are layered in the backlight unit 40, the extending direction of the linear structures 106 on one of the light diffusion sheets 43 may be the same as or may cross the extending directions of the linear structures 106 of the other light diffusion sheets 43.

Figure 7A:
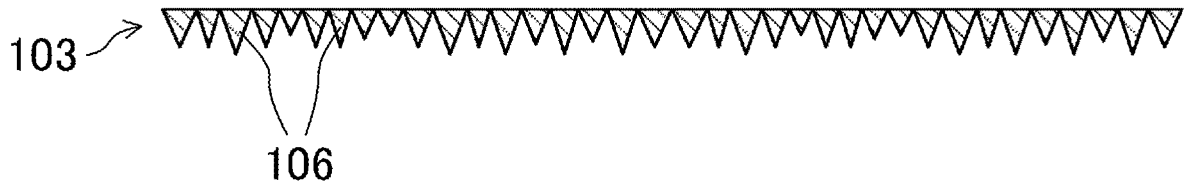
FIG. 7A shows that the linear structure constitutes a hairline.
Figure 7B:
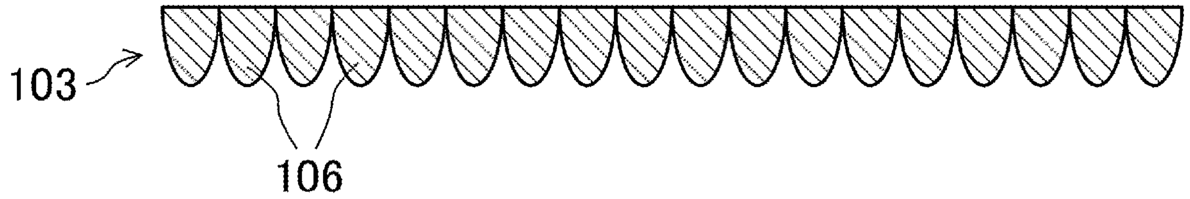
FIG. 7B shows that the linear structure constitutes a lenticular.
Figure 7C:
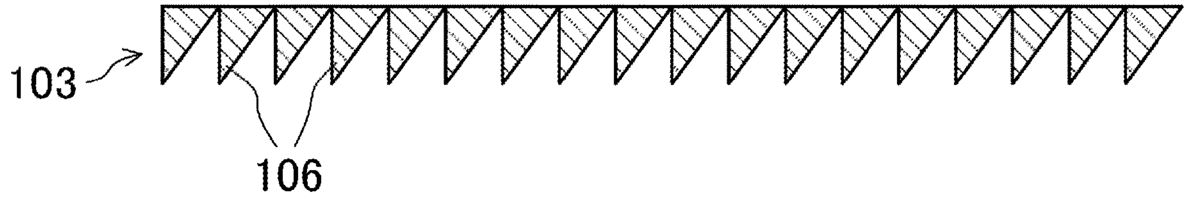
FIG. 7C shows that the linear structure constitutes diffraction grating.

The light diffusion sheet 43 shown in FIG. 3 includes stripe prisms as the plurality of linear structures 106; however, the linear structures 106 are not limited to these as long as the linear structures 106 have a convex shape extending in a predetermined direction on the second diffusion layer 103 (the second surface 43*b* of the light diffusion sheet 43). For example, as shown in FIG. 7, the plurality of linear structures 106 may constitute a hairline (FIG. 7A), a lenticular (FIG. 7B), a diffraction grating (FIG. 7C), or the like. The hairline forming the linear structures 106 may be, for example, an elongated streak formed by polishing the surface of the base material layer 101 in a single direction. The lenticular portion serving as the linear structures 106 may be, for example, a fine, elongated, domed convex lens body provided on the base material layer 101. The diffraction grating serving as the linear structures 106 may have, for example, a grating pattern including linear unevenness periodically juxtaposed on the surface of the base material layer 101. FIG. 7 shows variations of the cross-sectional configuration of the second diffusion layer 103 out of the cross-sectional configuration of the light diffusion sheet 43 shown in FIG. 3.

When prisms are provided as the linear structures 106, the heights of the prisms may be periodically varied in the vertical direction. That is, the apex (ridges) of the prisms forming the linear structures 106 may be raised and lowered in the vertical direction to make waves. Further, the widths of the prisms may be varied along with the heights of the prisms. Specifically, the width of the prism may be greater in a position where the height of the prism is greater, and the width of the prism may be narrower in a position where the height of the prism is lower. The heights and repetition cycles of the repeated apices of the prism ridges may be the same. By varying the heights of the prisms as described above, it is possible to reduce the contact area between the prisms and another light diffusion sheet 43 to be overlapped, and thus the contamination with foreign matter, scratches due to contact, and poor visibility of the user can be reduced.

When prisms are provided as the linear structures 106, the prisms may extend in a predetermined direction while being periodically meandered in a horizontal direction. Specifically, the alignment of the prism ridges may be periodically meandered without change in the shape (height, pitch, apex angle) of the prisms. That is, the prisms as the linear structures 106 may extend so as to make waves when the second surface 43*b* of the light diffusion sheet 43 is viewed from the front. Accordingly, it is possible to reduce occurrence of an interference pattern caused by a combination of the inverted pyramid-shaped recesses 105 and the prisms serving as the linear structures 106.

<Manufacturing Method of Light Diffusion Sheet (Lower Light Diffusion Sheet)>

The manufacturing method of the light diffusion sheet 43 is not particularly limited. For example, the light diffusion sheet 43 may be manufactured by any of the following five methods.

In a first manufacturing method, pellets of the base material resin (plastic resin) are formed into a resin film by an extrusion molding machine. Then, two metal rolls including a roll having on its surface protruding pyramid shapes and another roll having on its surface a plurality of linear recesses extending in a predetermined direction are pressed against the resin film to form a light diffusion sheet 43 having inverted pyramid shapes (recesses 105) on one of its surfaces and linear protruding shapes (linear structures 106) on the other one of its surfaces. This manufacturing method integrally forms the base material layer 101, the first diffusion layer 102, and the second diffusion layer 103.

In a second manufacturing method, pellets of the base material resin (plastic resin) are formed into a resin film by an extrusion molding machine. Then, two metal rolls including a roll having on its surface protruding pyramid shapes and another roll having a mirror surface are pressed against the resin film to form a sheet having inverted pyramid shapes (recesses 105) on one of its surfaces and a mirror surface on the other one of its surfaces (a sheet including the base material layer 101 and the first diffusion layer 102 integrated together). Next, while the sheet is fed between a pair of pressing rolls, an ultraviolet curable resin (protrusion forming resin composition) is supplied on the back surface side of the base material layer 101 (light incident surface side in a case where the sheet is incorporated with, for example, a liquid crystal display device 50) immediately before the pair of pressing rolls. Here, as the pressing roll that contacts with the ultraviolet curable resin, a roll having a plurality of linear recesses extending in a predetermined direction on its outer circumferential surface is used. After the sheet with the ultraviolet curable resin supplied thereon is pressed by the pair of pressing rolls, the ultraviolet curable resin is cured by applying ultraviolet rays, so that a plurality of linear protrusions (linear structures 106) having an inverted shape of the plurality of linear recesses are transferred on the surface of the sheet opposite to the surface on which the inverted pyramid shapes (recesses 105) are formed. In this manufacturing method, only the second diffusion layer 103 is formed separately.

In a third manufacturing method, pellets of the base material resin (plastic resin) are formed into a resin film by an extrusion molding machine. Then, two metal rolls including a roll having on its surface a plurality of linear recesses extending in a predetermined direction and another roll having a mirror-surface are pressed against the resin film to form a sheet having a plurality of linear protrusions (linear structures 106) that are inverted shapes of the plurality of linear recesses on one of its surfaces and a mirror surface on the other one of its surfaces (a sheet including the base material layer 101 and the second diffusion layer 103 integrated together). Next, while the sheet is fed between a pair of pressing rolls, an ultraviolet curable resin (protrusion forming resin composition) is supplied on the front surface side of the base material layer 101 (light emitting surface side in a case where the sheet is incorporated with, for example, a liquid crystal display device 50) immediately before the pair of pressing rolls. Here, as the pressing roll that contacts with the ultraviolet curable resin, a roll having a plurality of protrusions having a substantially inverted quadrangular pyramid shape on its outer circumferential surface is used. After the sheet with the ultraviolet curable resin supplied thereon is pressed by the pair of pressing rolls, the ultraviolet curable resin is cured by applying ultraviolet rays, so that a plurality of inverted pyramid shapes (recesses 105) having an inverted shape of the plurality of protrusions having a substantially inverted quadrangular pyramid shape are transferred on the surface of the sheet opposite to the surface on which the linear protrusions (linear structures 106) are formed. In this manufacturing method, only the first diffusion layer 102 is formed separately.

In the fourth manufacturing method, for example, a base material layer 101 containing polyethylene terephthalate as its main component is prepared. While the base material layer 101 is fed between a pair of first pressing rolls, a first ultraviolet curable resin (protrusion forming resin composition) is supplied on the back surface side of the base material layer 101 (light incident surface side in a case where the sheet is incorporated with, for example, a liquid crystal display device 50) immediately before the pair of first pressing rolls. Here, as the first pressing roll that contacts with the first ultraviolet curable resin, a roll having a plurality of linear recesses extending in a predetermined direction on its outer circumferential surface is used. After the base material layer 101 with the first ultraviolet curable resin supplied thereon is pressed by the pair of first pressing rolls, the first ultraviolet curable resin is cured by applying ultraviolet rays, so that a plurality of linear protruding shapes (linear structures 106) having an inverted shape of the plurality of linear recesses are transferred on the back surface side of the base material layer 101 (a sheet in which the base material layer 101 and the second diffusion layer 103 are layered). Next, while the sheet is fed between a pair of second pressing rolls, a second ultraviolet curable resin (protrusion forming resin composition) is supplied on the front surface side of the sheet (light emitting surface side in a case where the sheet is incorporated with, for example, a liquid crystal display device 50) having the plurality of linear protruding shapes (linear structures 106), immediately before the pair of second pressing rolls. As the second pressing roll that contacts with the second ultraviolet curable resin, a roll having a plurality of protrusions having a substantially inverted quadrangular pyramid shape on its outer circumferential surface is used. After the sheet with the second ultraviolet curable resin supplied thereon is pressed by the pair of second pressing rolls, the second ultraviolet curable resin is cured by applying ultraviolet rays, so that a plurality of inverted pyramid shapes (recesses 105) having an inverted shape of the plurality of protrusions having a substantially inverted quadrangular pyramid shape are transferred on the surface of the sheet opposite to the surface on which the linear protrusions (linear structures 106) are formed. In this manufacturing method, the base material layer 101, the first diffusion layer 102, and the second diffusion layer 103 are formed separately.

In a fifth manufacturing method, pellets of the base material resin (plastic resin) are formed into a resin film by an extrusion molding machine. Then, two flat metal plates including a flat plate having on its surface protruding pyramid shapes and another flat plate having on its surface a plurality of linear recesses extending in a predetermined direction are pressed (heat-pressed) against the resin film to form a light diffusion sheet 43 having inverted pyramid shapes (recesses 105) on one of its surfaces and linear protruding shapes (linear structures 106) on the other one of its surfaces. In this manufacturing method, the base material layer 101, the first diffusion layer 102, and the second diffusion layer 103 are formed integrally.

Features of Embodiment

The light diffusion sheet 43 of the present embodiment described hereinabove includes a plurality of recesses 105 having a substantially inverted quadrangular pyramid shape on one surface, and a plurality of linear structures 106 extending in a predetermined direction on the other surface, and the recesses 105 have an apex angle of 100° or more. Therefore, the synergistic effect of the light diffusing effect by the plurality of recesses 105 and the light diffusing effect by the plurality of linear structures 106 can be increased. This enables improvement of the luminance uniformity capability of the light diffusion sheet 43. Hence, it is possible to cope with reduction of the thickness or the number of layers of the light diffusion sheet 43 accompanied by further flattening.

In the light diffusion sheet 43 of the present embodiment, the plurality of linear structures 106 may constitute a prism, a hairline, a lenticular, or a diffraction grating. This in combination with the recesses 105 having a substantially inverted quadrangular pyramid shape can reliably increase the synergistic effects of the light diffusing effect.

In the light diffusion sheet 43 of the present embodiment, the plurality of recesses 105 are arrayed in a two-dimensional matrix, and the arraying direction may cross the extending direction of the linear structures 106. Accordingly, the synergistic effects of the light diffusing effect can be increased over a broader range of the apex angle θ of the recesses 105.

A backlight unit 40 of the present embodiment is incorporated into a liquid crystal display device 50 and leads light rays emitted from a plurality of light sources 42 to a display screen 50*a*. The backlight unit 40 includes the light diffusion sheet 43 of the present embodiment between the display screen 50*a* and the light sources 42. This enables improvement of the luminance uniformity capability of the light diffusion sheet 43, and hence it is possible to cope with reduction of the thickness or the number of layers of the light diffusion sheet 43 accompanied by further flattening.

In the backlight unit 40 of the present embodiment, the plurality of light sources 42 may be arranged on a reflective sheet 41 provided on an opposite side of the display screen 50*a* when viewed from the light diffusion sheet 43. This causes multiple reflections between the light diffusion sheet 43 and the reflective sheet 41 thus causing further diffusion of light rays, and hence the in-plane luminance uniformity is further improved.

In the backlight unit 40 of the present embodiment, a plurality of the light diffusion sheets 43 may be layered and arranged between the display screen 50*a* and the plurality of light sources 42. Accordingly, the in-plane luminance uniformity can be further improved with the plurality of light diffusion sheets 43. In this case, in the plurality of light diffusion sheets 43 in layer, the direction in which the plurality of linear structures 106 in one light diffusion sheet 43 extend may cross the direction in which the plurality of linear structures 106 on another light diffusion sheets 43 extend. Accordingly, generation of moire (interference fringes) can be reduced.

In the backlight unit 40 of the present embodiment, the distance between the plurality of light sources 42 and the light diffusion sheet 43 may be 0 mm or more and 1 mm or less. Accordingly, even if a sufficient distance between the light sources and the sheet cannot be ensured due to flattening, deterioration in the in-plane luminance uniformity can be alleviated with the diffusion performance of the light diffusion sheet 43 of the present embodiment.

A liquid crystal display device 50 of the present embodiment includes the backlight unit 40 of the present embodiment and a liquid crystal display panel 5. Thus, since the in-plane luminance uniformity can be improved by the backlight unit 40, the in-plane luminance uniformity can be maintained even for reduction in the thickness or the number of layers of the light diffusion sheet 43 or the like, accompanied by further flattening. The similar advantages can be achieved also in information devices (personal computers, mobile phones, and the like) incorporating the liquid crystal display device 50 of the present embodiment.

In the present embodiment, the backlight unit 40 is a direct-type backlight unit in which a plurality of light sources 42 are distributed on the back surface of a display screen 50*a* of the liquid crystal display device 50. Thus, a decrease in the distance between the light sources 42 and light diffusion sheets 43 is needed to downsize the liquid crystal display device 50. However, a decrease in this distance tends to cause, for example, the phenomenon that the regions of the display screen 50*a* above the spaces between the distributed small light sources 42 have a lower luminance than the other regions (i.e., luminance unevenness).

In contrast, the light diffusion sheet 43 of the present embodiment is useful for reducing the luminance unevenness. In particular, the light diffusion sheet 43 of the present embodiment is believed to be more useful if the distance between the light sources 42 and the light diffusion sheet (lower light diffusion sheet) 43 is set to 15 mm or less, preferably 10 mm or less, more preferably 5 mm or less, further more preferably 2 mm or less, and ultimately 0 mm, aiming to reduce the thickness of small and mid-sized liquid crystal display in the future.

First Example

The following describes a first example. As evaluation samples of the first example of the light diffusion sheet 43 described above, samples with recesses 105 having inverted pyramid shapes whose apex angle θ was 100° or 120° as shown in Table 1 were prepared. In either sample, an acrylate-based UV curable resin was used to transfer the inverted pyramid shapes and the linear structures 106 (prism shapes) to the base material layer 101 made of polycarbonate.

TABLE 1

| Evaluation samples | | | | | | | Total |
|---|---|---|---|---|---|---|---|
| Inverted pyramid shape (mold) | | | | Prism shape (mold) | | | thickness of three |
| Apex angle (°) | Height (μm) | Pitch (μm) | Base material Thickness (μm) | Apex angle (°) | Height (μm) | Pitch (μm) | layered sheets (μm) |
| 80 | 50 | 84 | 70 | 64 | 50 | 62 | 560 |
| 100 | 50 | 119 | 70 | 64 | 50 | 62 | 560 |
| 120 | 50 | 180 | 70 | 64 | 50 | 62 | 560 |
| 80 | 50 | 84 | 90 | 90 | 12.5 | 25 | 530 |
| 100 | 50 | 119 | 90 | 90 | 12.5 | 25 | 530 |
| 120 | 50 | 180 | 90 | 90 | 12.5 | 25 | 530 |
| 80 | 50 | 84 | 70 | 180 | 0 | 0 | 390 |
| 90 | 50 | 100 | 70 | 180 | 0 | 0 | 360 |
| 100 | 50 | 119 | 70 | 180 | 0 | 0 | 360 |
| 120 | 50 | 180 | 70 | 180 | 0 | 0 | 350 |

As shown in Table 1, the heights of the inverted pyramid shapes were set to 50 μm for all the evaluation samples. Thus, the arraying pitch of the inverted pyramid shapes was 119 μm in the sample with the inverted pyramid shapes having the apex angle θ of 100°, whereas the arraying pitch of the inverted pyramid shapes was 180 μm in the sample with the inverted pyramid shapes having the apex angle θ of 120°.

Further, for the each of the samples with the inverted pyramid shapes having an apex angle θ of 100° or 120°, two types of samples were prepared, one of which had the base material layer 101 with the thickness of 70 μm and had the prism shapes as the linear structures 106 with the apex angle (which may be hereinafter referred to as a prism angle) of 64°, and the other one of which had the base material layer 101 with the thickness of 90 μm and had the prism angle of 90°. In the sample having the prism angle of 64°, the height of the prism shape was set to 50 μm, and the array pitch of the prism shape was set to 62 μm. In the sample having the prism angle of 90°, the height of the prism shape was set to 12.5 μm, and the array pitch of the prism shape was set to 25 μm.

Table 1 shows values of the apex angles θ, heights, and pitches of the inverted pyramid shapes, and also the apex angles, heights, and pitches of the prism shapes, all of which are obtained from the dimension of the dies to form these shapes.

Further, as shown in Table 1, as an evaluation sample serving as a comparative example, samples having inverted pyramid shapes with the apex angle θ of 80° (50 μm in height and 84 μm in pitch) and a prism angle of 64° or 90° (with the height and pitch of the prism shapes as mentioned hereinabove) were prepared. Further, as evaluation samples serving as another comparative example, samples with their inverted pyramid shapes having an apex angle θ of 80°, 90°, 100°, or 120° (the height and pitch of the inverted pyramid shapes are as described hereinabove, except for those having the apex angle θ of 90°); with the base material layers 101 having a thickness of 70 μm; and with no prisms (corresponding to a prism angle of 180°), that is, no second diffusion layers 103, as shown in Table 1. The height and array pitch of the inverted pyramid shapes were 50 μm and 100 μm, respectively, in the sample with the inverted pyramid shapes having the apex angle θ of 90°.

The in-plane luminance uniformity of the evaluation samples of the first example and the comparative example shown in Table 1 were evaluated with the backlight unit 40 shown in FIG. 2 configured as described below. As the plurality of light sources 42, an array of blue LEDs arrayed at a pitch of 3 mm was used. In each evaluation sample (light diffusion sheet 43), three sheets having the same configuration and oriented in the same direction (oriented so the extending directions of the linear structures 106 match with one another) were layered and used. The total thicknesses of each sample having three layers are shown in Table 1. To reduce floating of the sheets constituting the backlight unit 40, a transparent glass plate was placed on the light diffusion sheet (upper light diffusion sheet) 47.

For the backlight unit 40 configured as described above, the luminance in the upward vertical direction (a direction from the LED array toward the glass plate) was measured using a two-dimensional color luminance meter UA-200 manufactured by Topcon Technohouse Corporation. Next, for two-dimensional luminance distribution images obtained, variation in the light emitting intensity of individual LEDs was corrected and filtering process was conducted to reduce bright/dark spot noise caused by foreign materials and the like. Then, average value and standard deviation were calculated for the luminance of all the pixels. Lastly, with the definition of the "in-plane luminance uniformity" as "average value of luminance/standard deviation of luminance," the in-plane luminance uniformity was calculated for the evaluation samples of the first example and the comparative example. The evaluation of the in-plane luminance uniformity was conducted for both a case where the samples were layered with their inverted pyramid shapes (recesses 105) provided on the light emitting surface (in the direction as shown in FIG. 3), and a case where the samples were layered with their inverted pyramid shapes (recesses 105) provided on the light incident surface (in the direction of FIG. 3 turned upside down).

Figure 8:
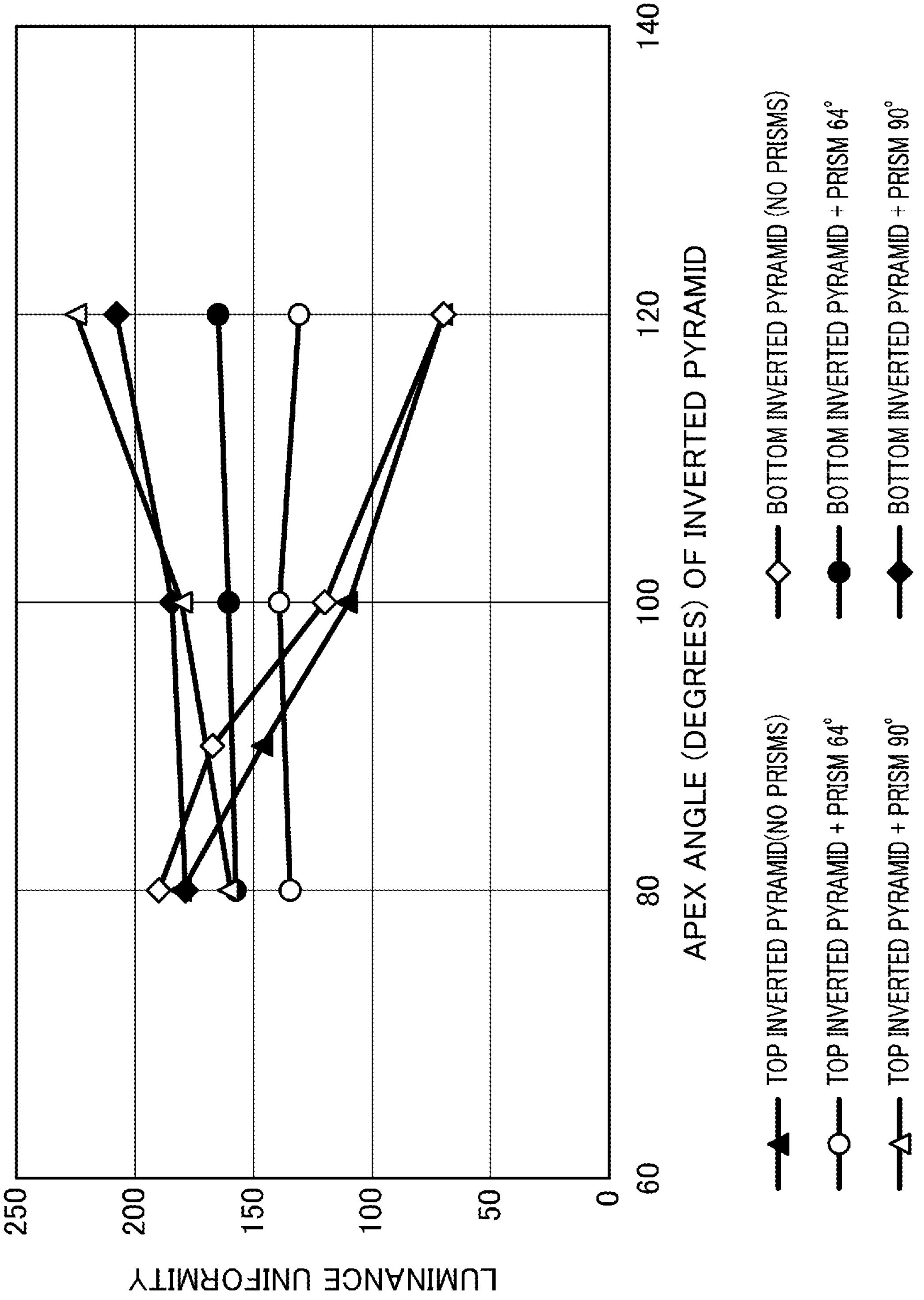
FIG. 8 shows evaluation results of in-plane luminance uniformity of the light diffusion sheets of the first example and the comparative example.

FIG. 8 and Table 2 show evaluation results of the in-plane luminance uniformity for the evaluation samples of the first example and the comparative examples. The labels "Top Inverted Pyramid" in FIG. 8 and "(Top)" in Table 2 indicate that the inverted pyramid shapes are on the light emitting surface, whereas the labels "Bottom Inverted Pyramid" in FIG. 8 and "(Bottom)" in Table 2 indicate that the inverted pyramid shapes are on the light incident surface. Further, Table 2 omits calculated values of the in-plane luminance uniformity for the inverted pyramid shapes having the apex angle θ of 90°.

TABLE 2

| | | (Top) Inverted pyramid apex angle (degrees) | | | (Bottom) Inverted pyramid apex angle (degrees) | | |
|---|---|---|---|---|---|---|---|
| | | 80 | 100 | 120 | 80 | 100 | 120 |
| Prism | 64 | 136 | 141 | 132 | 159 | 161 | 166 |
| Apex | 90 | 162 | 181 | 225 | 178 | 185 | 207 |
| angle | 180 | 183 | 113 | 69 | 197 | 117 | 69 |
| (Degree) | | | | | | | |

As shown in FIG. 8 and Table 2, the first example with the inverted pyramid shapes having an apex angle of 100° or 120° and with the prism shapes exhibited generally higher in-plane luminance uniformity than the comparative example with the inverted pyramid shape having the apex angle of 80° or the comparative example having no prism shapes. Specifically, in the comparative example having no prism shapes (the sample having a flat surface with the prism angle of 180°), the in-plane luminance uniformity decreased as the apex angle of the inverted pyramid shapes increased. In contrast, when the prism shapes were provided, the in-plane luminance uniformity increased as the apex angle of the inverted pyramid shapes increased, and also as the prism angle increased. Particularly in the first example having the inverted pyramid shapes with the apex angle of 120° and prism shapes with the prism angle of 90°, the in-plane luminance uniformity was high values of over 200 in either case of the inverted pyramid shapes being arranged on the light emitting surface and arranged on the light incident surface.

Second Example

The following describes a second example. As evaluation samples of the second example of the light diffusion sheet 43, samples with recesses 105 having inverted pyramid shapes with the apex angle θ (which may be also hereinafter referred to as pyramid apex angle) of 80°, 90°, 100°, 120°, 140°, or 160° were prepared as shown in Table 3. In either sample, an acrylate-based UV curable resin was used to transfer the inverted pyramid shapes and the linear structures 106 (prism shapes) to the base material layer 101 made of polycarbonate.

TABLE 3

| Evaluation samples | | | | | | | Total thick-ness of two layered sheets (μm) |
|---|---|---|---|---|---|---|---|
| Inverted pyramid shape (mold) | | | Base material | Prism shape (mold) | | | |
| Apex angle (°) | Height (μm) | Pitch (μm) | Thick-ness (μm) | Apex angle (°) | Height (μm) | Pitch (μm) | |
| 80 | 50 | 84 | 50 | 80 | 50 | 84 | 300 |
| 90 | 50 | 100 | 50 | 80 | 50 | 84 | 300 |
| 100 | 50 | 118 | 50 | 80 | 50 | 84 | 300 |
| 120 | 50 | 172 | 50 | 80 | 50 | 84 | 300 |
| 140 | 50 | 275 | 50 | 80 | 50 | 84 | 300 |
| 160 | 50 | 568 | 50 | 80 | 50 | 84 | 300 |
| 80 | 50 | 84 | 50 | 90 | 50 | 100 | 300 |
| 90 | 50 | 100 | 50 | 90 | 50 | 100 | 300 |
| 100 | 50 | 118 | 50 | 90 | 50 | 100 | 300 |
| 120 | 50 | 172 | 50 | 90 | 50 | 100 | 300 |
| 140 | 50 | 275 | 50 | 90 | 50 | 100 | 300 |
| 160 | 50 | 568 | 50 | 90 | 50 | 100 | 300 |
| 80 | 50 | 84 | 50 | 100 | 50 | 118 | 300 |
| 90 | 50 | 100 | 50 | 100 | 50 | 118 | 300 |
| 100 | 50 | 118 | 50 | 100 | 50 | 118 | 300 |
| 120 | 50 | 172 | 50 | 100 | 50 | 118 | 300 |
| 140 | 50 | 275 | 50 | 100 | 50 | 118 | 300 |
| 160 | 50 | 568 | 50 | 100 | 50 | 118 | 300 |
| 80 | 50 | 84 | 50 | 120 | 50 | 172 | 300 |
| 90 | 50 | 100 | 50 | 120 | 50 | 172 | 300 |
| 100 | 50 | 118 | 50 | 120 | 50 | 172 | 300 |
| 120 | 50 | 172 | 50 | 120 | 50 | 172 | 300 |
| 140 | 50 | 275 | 50 | 120 | 50 | 172 | 300 |
| 160 | 50 | 568 | 50 | 120 | 50 | 172 | 300 |

As shown in table 3, the heights of the inverted pyramid shapes were set to 50 μm for all the evaluation samples. Accordingly, the sample with the pyramid apex angle of 80° had the inverted pyramid shapes with the array pitch of 84 μm. The sample with the pyramid apex angle of 90° had the inverted pyramid shapes with the array pitch of 100 μm. The sample with the pyramid apex angle of 100° had the inverted pyramid shapes with the array pitch of 118 μm. The sample with the pyramid apex angle of 120° had the inverted pyramid shapes with the array pitch of 172 μm. The sample with the pyramid apex angle of 140° had the inverted pyramid shapes with the array pitch of 275 μm. The sample with the pyramid apex angle of 160° had the inverted pyramid shapes with the array pitch of 568 μm.

Further, for each of the samples with a pyramid apex angle ranging from 80° to 160°, four types of samples having the prism shapes as the linear structures 106 with the apex angle (which may be hereinafter referred to as prism apex angle) of 80°, 90°, 100°, or 120° were prepared, each of which also had the base material layer 101 with the thickness of 50 μm. The height of the prism shapes was set to 50 μm for all the samples with any of the prism apex angle. Then, the sample with the prism apex angle of 80° had the prism shapes with the array pitch of 84 μm. The sample with the prism apex angle of 90° had the prism shapes with the array pitch of 100 μm. The sample with the prism apex angle of 100° had the prism shapes with the array pitch of 118 μm. The sample with the prism apex angle of 120° had the prism shapes with the array pitch of 172 μm.

Table 3 shows values of the apex angles, heights and pitches of the inverted pyramid shapes, and also the apex angles, heights, and pitches of the prism shapes, all of which are obtained from the dimension of the dies to form these shapes.

Figure 9:
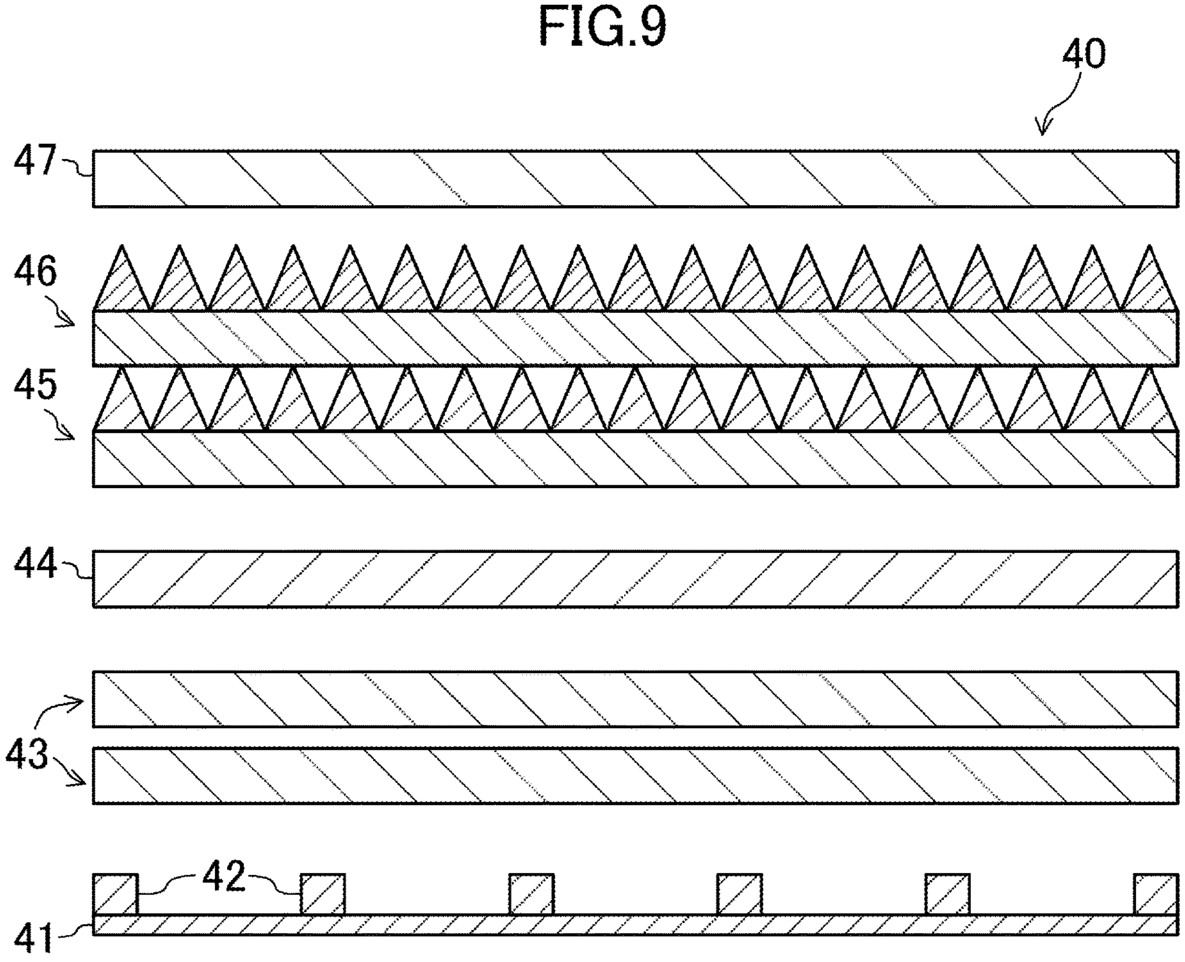
FIG. 9 is a cross-sectional view of backlight units of a second example and a third example into which the light diffusion sheets are incorporated.
Figure 10:
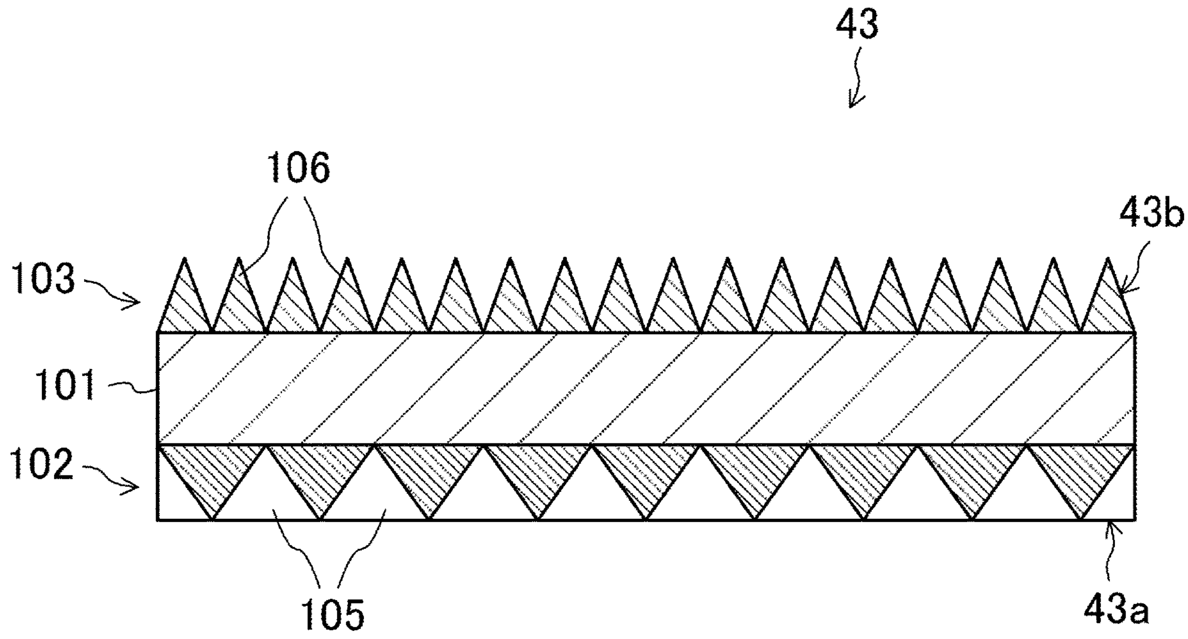
FIG. 10 is a cross-sectional view of a light diffusion sheet of the second example.

The in-plane luminance uniformity of the evaluation samples of the second example shown in Table 3 were evaluated with the backlight unit 40 configured as shown in FIG. 9 and FIG. 10. In FIG. 9 and FIG. 10, the components identical to those of the backlight unit 40 shown in FIG. 2 and the light diffusion sheet 43 shown in FIG. 3 are labeled with the same reference characters. Although the backlight unit 40 shown in FIG. 2 includes three layers of light diffusion sheets 43 having the same configuration, the backlight unit 40 shown in FIG. 9 includes two layers of the light diffusion sheets 43 having the same configuration. Further, although the backlight unit 40 shown in FIG. 2 has the light diffusion sheets 43 arranged so that the first surface 43*a* (the surface having the recesses 105) serves as the light emitting surface as shown in FIG. 3, the backlight unit 40 shown in FIG. 9 has the light diffusion sheets 43 arranged so that the first surface 43*a* (the surface having the recesses 105) serves as the light incident surface as shown in FIG. 10. In each evaluation sample (light diffusion sheet 43), two sheets were layered and oriented so that the extending directions of the linear structures 106 match with one another. The total thicknesses of each sample having two layers are shown in Table 3. As the plurality of light sources 42, an array of blue LEDs arrayed at a pitch of 3 mm was used. To reduce floating of the sheets constituting the backlight unit 40, a transparent glass plate was placed on the light diffusion sheet (upper light diffusion sheet) 47.

Figure 11:
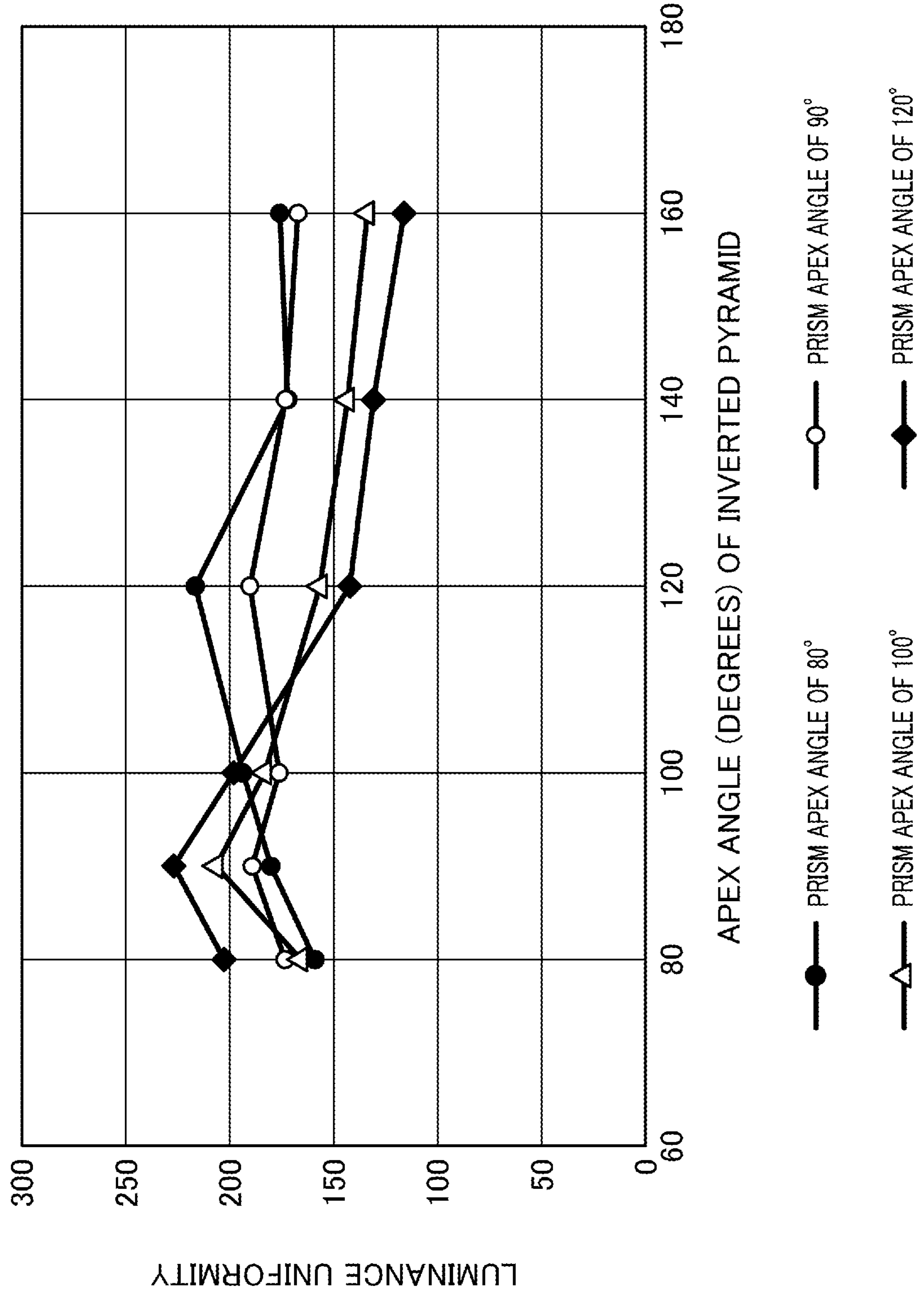
FIG. 11 shows evaluation results of in-plane luminance uniformity of the light diffusion sheets of the second example.
Figure 12:
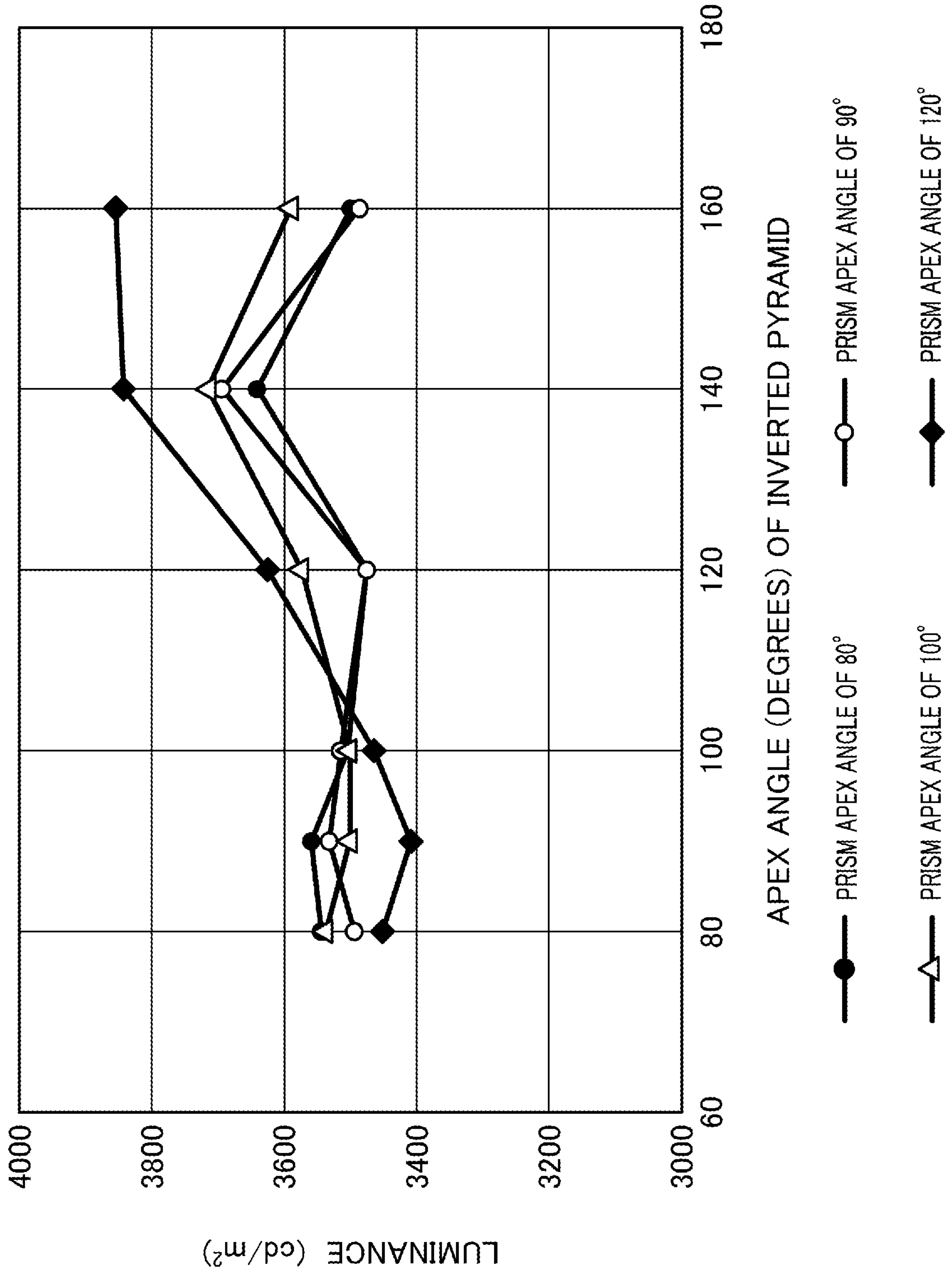
FIG. 12 shows evaluation results of luminance (average value) of the light diffusion sheets of the second example.

For the backlight units 40 configured as described above, the luminance (average value) and the in-plane luminance uniformity were calculated similarly to the first example. FIG. 11 and FIG. 12 show evaluation results of the in-plane luminance uniformity and the luminance (average value) of the evaluation samples of the second example, respectively.

As shown in FIG. 11, it was found that when the prism apex angle was 95° or less, excellent in-plane luminance uniformity was obtained if the pyramid apex angle was set to 110° or more and 130° or less. The prism apex angle may be set to about 60° or more from a practical stand point of view.

As shown in FIG. 11, it was found that when the prism apex angle was 95° or more, excellent in-plane luminance uniformity was obtained if the pyramid apex angle was set to 85° or more and 95° or less.

Further, as shown in FIG. 12, it was found that for all the evaluation samples with any of the prism apex angles, the luminance was increased while the luminance uniformity capability was improved if the pyramid apex angle was set to 130° or more and 150° or less.

Third Example

The following describes a third example. As evaluation samples of the third example of the light diffusion sheet 43, samples shown in Table 3 were used similarly to the second example.

The in-plane luminance uniformity of the evaluation samples of the third example were evaluated with the backlight unit 40 configured as shown in FIG. 9. That is, also in the third example, similarly to the second example, two light diffusion sheets 43 having the same configuration were layered in the backlight unit 40 shown in FIG. 9. In the second example, the light diffusion sheets 43 were arranged so that the first surface 43*a* (the surface having the recesses 105) served as a light incident surface as shown in FIG. 10, whereas, in the third example, similarly to the first example, the light diffusion sheets 43 were arranged so that the first surface 43*a* (the surface having the recesses 105) served as a light emitting surface as shown in FIG. 3. In each evaluation sample (light diffusion sheet 43), two sheets were layered and oriented so that the extending directions of the linear structures 106 match with one another. The total thicknesses of each sample having two layers are shown in Table 3. As the plurality of light sources 42, an array of blue LEDs arrayed at a pitch of 3 mm was used. To reduce floating of the sheets constituting the backlight unit 40, a transparent glass plate was placed on the light diffusion sheet (upper light diffusion sheet) 47.

Figure 13:
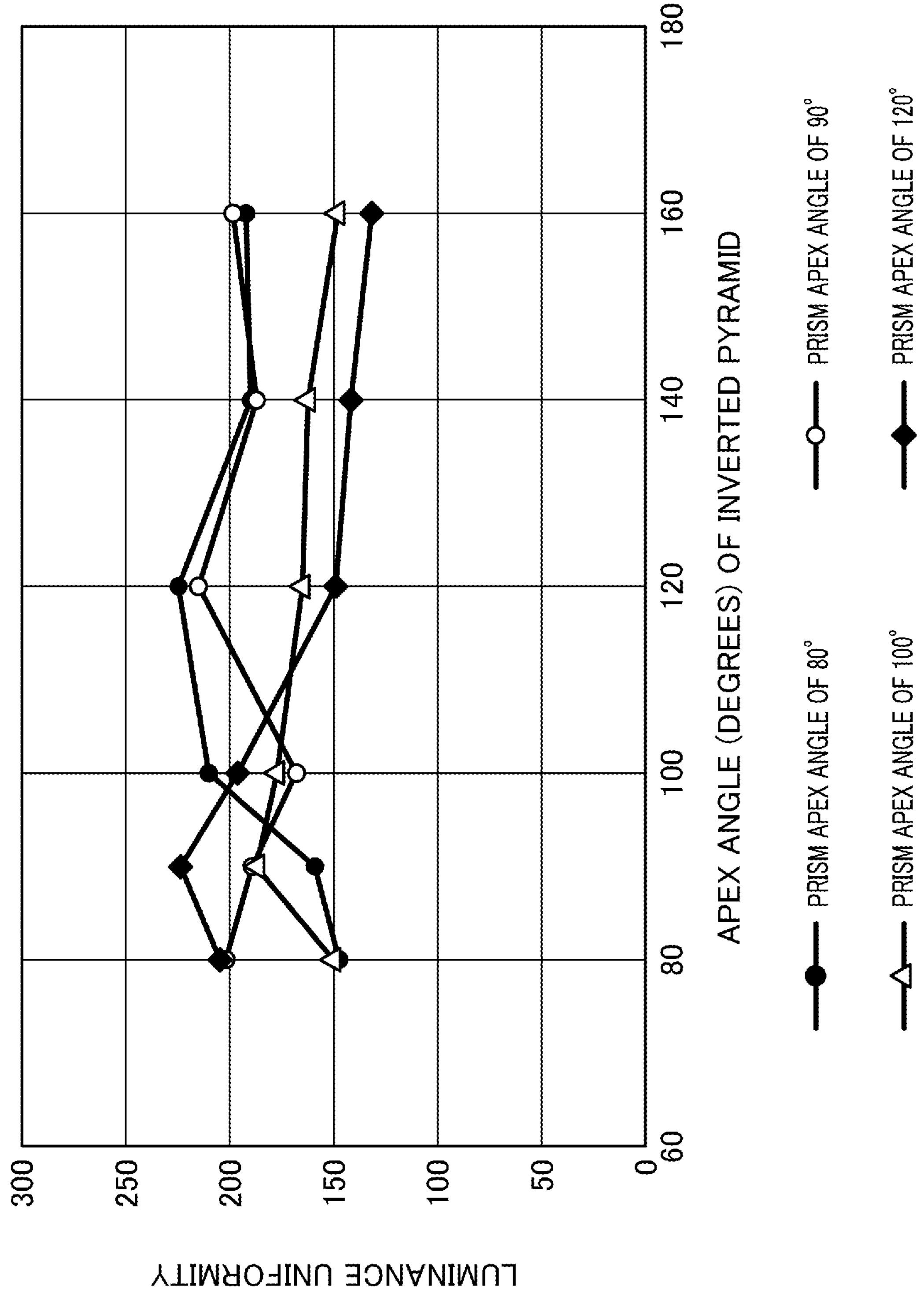
FIG. 13 shows evaluation results of in-plane luminance uniformity of the light diffusion sheets of the third example.
Figure 14:
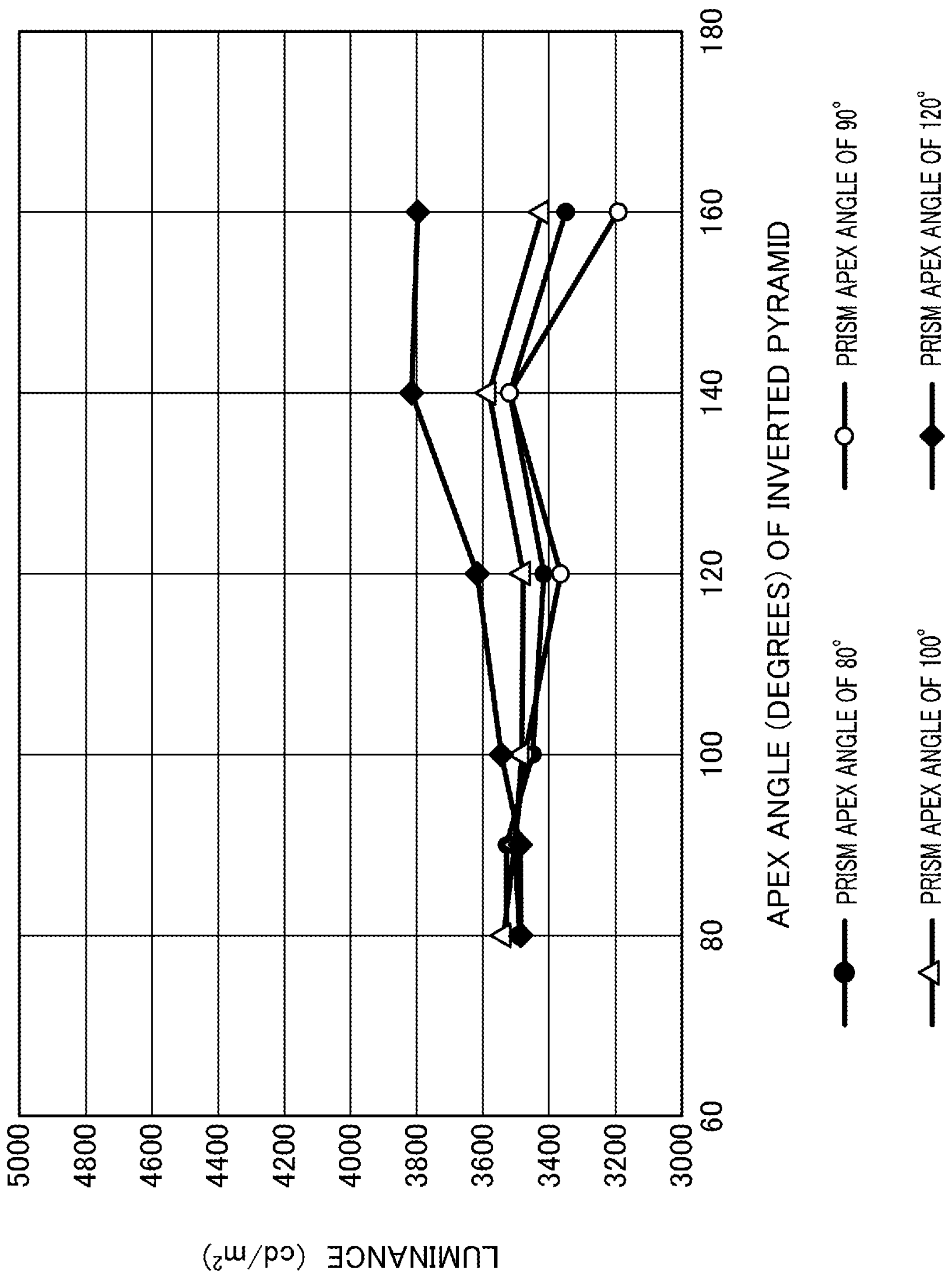
FIG. 14 shows evaluation results of luminance (average value) of the light diffusion sheets of the third example.

For the backlight units 40 configured as described above, the luminance (average value) and the in-plane luminance uniformity were calculated similarly to the first example. FIG. 13 and FIG. 14 show evaluation results of the in-plane luminance uniformity and the luminance (average value) of the evaluation samples of the third example.

As shown in FIG. 13, it was found that when the prism apex angle was 95° or less, excellent in-plane luminance uniformity was obtained if the pyramid apex angle was set to 110° or more and 130° or less. The prism apex angle may be set to about 60° or more from a practical stand point of view.

As shown in FIG. 13, it was found that when the prism apex angle was 95° or more, excellent in-plane luminance uniformity was obtained if the pyramid apex angle was set to 85° or more and 95° or less.

Further, as shown in FIG. 14, it was found that when the prism apex angle was 110° or less, the luminance slightly decreased if the pyramid apex angle was set to 150° or more, whereas, when the prism apex angle was 110° or more, the luminance increased if the pyramid apex angle was set to 130° or more. As described above, the luminance exhibited a different tendency in the third example from the second example shown in FIG. 12.

Next, Table 4 and Table 5 show evaluation results of the in-plane luminance uniformity and luminance (average value) for various combinations of evaluation samples of the third example, including configurations with different pyramid apex angles and different prism apex angles depending on the light diffusion sheets 43 on the light incident side (lower side) and the light diffusion sheets 43 on the light emitting side (upper side). The unit of the luminance shown in Table 5 is cd/m$^2$.

TABLE 4

| Pyramid apex angle (degree) of light diffusion sheet on light emitting side | Prism apex angle (degree) of light diffusion sheet on light emitting side | Pyramid apex angle (degree) of light diffusion sheet on light incident side | | | | | | | | | | | | | | | | | | | | | | | |
|---|---|---|---|---|---|---|---|---|---|---|---|---|---|---|---|---|---|---|---|---|---|---|---|---|---|
| | | 80 | 80 | 80 | 80 | 90 | 90 | 90 | 90 | 100 | 100 | 100 | 100 | 120 | 120 | 120 | 120 | 140 | 140 | 140 | 140 | 160 | 160 | 160 | 160 |
| | | Prism apex angle (degree) of light diffusion sheet on light incident side | | | | | | | | | | | | | | | | | | | | | | | |
| | | 80 | 90 | 100 | 120 | 80 | 90 | 100 | 120 | 80 | 90 | 100 | 120 | 80 | 90 | 100 | 120 | 80 | 90 | 100 | 120 | 80 | 90 | 100 | 120 |
| 80 | 80 | 147 | | | 177 | 170 | | | 178 | 194 | | | 184 | 213 | | | 176 | 189 | | | 168 | 198 | | | 157 |
| 80 | 90 | | 202 | | | | 221 | | | | 213 | | | | 221 | | | | 226 | | | | 210 | | |
| 80 | 100 | | | 150 | | | | 209 | | | | 204 | | | | 201 | | | | 178 | | | | 180 | |
| 80 | 120 | 187 | | | 205 | | | | 229 | | | | 201 | | | | 218 | | | | 212 | | | | 190 |

TABLE 4-continued

| Pyramid apex angle (degree) of light diffusion sheet on light emitting side | Prism apex angle (degree) of light diffusion sheet on light emitting side | Pyramid apex angle (degree) of light diffusion sheet on light incident side | | | | | | | | | | | | | | | | | | | | | | | |
|---|---|---|---|---|---|---|---|---|---|---|---|---|---|---|---|---|---|---|---|---|---|---|---|---|---|
| | | 80 | 80 | 80 | 80 | 90 | 90 | 90 | 90 | 100 | 100 | 100 | 100 | 120 | 120 | 120 | 120 | 140 | 140 | 140 | 140 | 160 | 160 | 160 | 160 |
| | | Prism apex angle (degree) of light diffusion sheet on light incident side | | | | | | | | | | | | | | | | | | | | | | | |
| | | 80 | 90 | 100 | 120 | 80 | 90 | 100 | 120 | 80 | 90 | 100 | 120 | 80 | 90 | 100 | 120 | 80 | 90 | 100 | 120 | 80 | 90 | 100 | 120 |
| 90 | 80 | 169 | | | | 159 | | | | | | | | | | | | | | | | | | | |
| 90 | 90 | | 212 | | | | 189 | | | | | | | | | | | | | | | | | | |
| 90 | 100 | | | 186 | | | | 187 | | | | | | | | | | | | | | | | | |
| 90 | 120 | 199 | | | 231 | | | | 224 | | | | | | | | | | | | | | | | |
| 100 | 80 | 178 | | | | | | | | 210 | | | | | | | | | | | | | | | |
| 100 | 90 | | 190 | | | | | | | | 168 | | | | | | | | | | | | | | |
| 100 | 100 | | | 180 | | | | | | | | 177 | | | | | | | | | | | | | |
| 100 | 120 | 173 | | | 199 | | | | | | | | 196 | | | | | | | | | | | | |
| 120 | 80 | 185 | | | | | | | | | | | | 225 | | | | | | | | | | | |
| 120 | 90 | | 182 | | | | | | | | | | | | 215 | | | | | | | | | | |
| 120 | 100 | | | 169 | | | | | | | | | | | | 165 | | | | | | | | | |
| 120 | 120 | 154 | | | 178 | | | | | | | | | | | | 149 | | | | | | | | |
| 140 | 80 | 157 | | | | | | | | | | | | | | | | 190 | | | | | | | |
| 140 | 90 | | 184 | | | | | | | | | | | | | | | | 187 | | | | | | |
| 140 | 100 | | | 158 | | | | | | | | | | | | | | | | 162 | | | | | |
| 140 | 120 | 143 | | | 163 | | | | | | | | | | | | | | | | 142 | | | | |
| 160 | 80 | 173 | | | | | | | | | | | | | | | | | | | | 192 | | | |
| 160 | 90 | | 171 | | | | | | | | | | | | | | | | | | | | 198 | | |
| 160 | 100 | | | 147 | | | | | | | | | | | | | | | | | | | | 148 | |
| 160 | 120 | 145 | | | 157 | | | | | | | | | | | | | | | | | | | | 132 |

TABLE 5

| Pyramid apex angle (degree) of light diffusion sheet on light emitting side | Prism apex angle (degree) of light diffusion sheet on light emitting side | Pyramid apex angle (degree) of light diffusion sheet on light incident side | | | | | | | | | | | | |
|---|---|---|---|---|---|---|---|---|---|---|---|---|---|---|
| | | 80 | 80 | 80 | 80 | 90 | 90 | 90 | 90 | 100 | 100 | 100 | 100 | 120 |
| | | Prism apex angle (degree) of light diffusion sheet on light incident side | | | | | | | | | | | | |
| | | 80 | 90 | 100 | 120 | 80 | 90 | 100 | 120 | 80 | 90 | 100 | 120 | 80 |
| 80 | 80 | 3530 | | | 3628 | 3560 | | | 3637 | 3543 | | | 3653 | 3555 |
| 80 | 90 | | 3489 | | | | 3522 | | | | 3546 | | | |
| 80 | 100 | | | 3537 | | | | 3546 | | | | 3558 | | |
| 80 | 120 | 3669 | | | 3485 | | | | 3524 | | | | 3569 | |
| 90 | 80 | 3577 | | | | 3528 | | | | | | | | |
| 90 | 90 | | 3556 | | | | 3504 | | | | | | | |
| 90 | 100 | | | 3574 | | | | 3504 | | | | | | |
| 90 | 120 | 3697 | | | 3565 | | | | 3487 | | | | | |
| 100 | 80 | 3548 | | | | | | | | 3449 | | | | |
| 100 | 90 | | 3545 | | | | | | | | 3474 | | | |
| 100 | 100 | | | 3568 | | | | | | | | 3483 | | |
| 100 | 120 | 3700 | | | 3611 | | | | | | | | 3545 | |
| 120 | 80 | 3533 | | | | | | | | | | | | 3416 |
| 120 | 90 | | 3514 | | | | | | | | | | | |
| 120 | 100 | | | 3590 | | | | | | | | | | |
| 120 | 120 | 3718 | | | 3651 | | | | | | | | | |
| 140 | 80 | 3574 | | | | | | | | | | | | |
| 140 | 90 | | 3566 | | | | | | | | | | | |
| 140 | 100 | | | 3634 | | | | | | | | | | |
| 140 | 120 | 3788 | | | 3743 | | | | | | | | | |
| 160 | 80 | 3479 | | | | | | | | | | | | |
| 160 | 90 | | 3422 | | | | | | | | | | | |
| 160 | 100 | | | 3544 | | | | | | | | | | |
| 160 | 120 | 3748 | | | 3734 | | | | | | | | | |

TABLE 5-continued

| Pyramid apex angle (degree) of light diffusion sheet on light emitting side | Prism apex angle (degree) of light diffusion sheet on light emitting side | Pyramid apex angle (degree) of light diffusion sheet on light incident side | | | | | | | | | | |
|---|---|---|---|---|---|---|---|---|---|---|---|---|
| | | 120 | 120 | 120 | 140 | 140 | 140 | 140 | 160 | 160 | 160 | 160 |
| | | Prism apex angle (degree) of light diffusion sheet on light incident side | | | | | | | | | | |
| | | 90 | 100 | 120 | 80 | 90 | 100 | 120 | 80 | 90 | 100 | 120 |
| 80 | 80 | | | 3671 | 3630 | | | 3749 | 3591 | | | 3744 |
| 80 | 90 | 3541 | | | | 3646 | | | | 3563 | | |
| 80 | 100 | | 3598 | | | | 3667 | | | | 3621 | |
| 80 | 120 | | | 3624 | | | | 3719 | | | | 3729 |
| 90 | 80 | | | | | | | | | | | |
| 90 | 90 | | | | | | | | | | | |
| 90 | 100 | | | | | | | | | | | |
| 90 | 120 | | | | | | | | | | | |
| 100 | 80 | | | | | | | | | | | |
| 100 | 90 | | | | | | | | | | | |
| 100 | 100 | | | | | | | | | | | |
| 100 | 120 | | | | | | | | | | | |
| 120 | 80 | | | | | | | | | | | |
| 120 | 90 | 3365 | | | | | | | | | | |
| 120 | 100 | | 3479 | | | | | | | | | |
| 120 | 120 | | | 3618 | | | | | | | | |
| 140 | 80 | | | | 3519 | | | | | | | |
| 140 | 90 | | | | | 3649 | | | | | | |
| 140 | 100 | | | | | | 3582 | | | | | |
| 140 | 120 | | | | | | | 3815 | | | | |
| 160 | 80 | | | | | | | | 3350 | | | |
| 160 | 90 | | | | | | | | | 3192 | | |
| 160 | 100 | | | | | | | | | | 3422 | |
| 160 | 120 | | | | | | | | | | | 3796 |

As shown in Table 4 and Table 5, it was found that in the third example, both the in-plane luminance uniformity and the luminance tended to generally improve when the pyramid apex angle of the light diffusion sheet 43 on the light emitting side was made greater than the pyramid apex angle of the light diffusion sheet 43 on the light incident side.

Table 6 and Table 7 show results of the similar evaluation of the in-plane luminance uniformity and the luminance (average value) conducted for various combinations of the evaluation samples in the second example described above. The unit of the luminance shown in Table 7 is cd/$m^2$.

TABLE 6

| Pyramid apex angle (degree) of light diffusion sheet on light emitting side | Prism apex angle (degree) of light diffusion sheet on light emitting side | Pyramid apex angle (degree) of light diffusion sheet on light incident side | | | | | | | | | | | | | |
|---|---|---|---|---|---|---|---|---|---|---|---|---|---|---|---|
| | | 80 | 80 | 80 | 80 | 90 | 90 | 90 | 90 | 100 | 100 | 100 | 100 | 120 | 120 |
| | | Prism apex angle (degree) of light diffusion sheet on light incident side | | | | | | | | | | | | | |
| | | 80 | 90 | 100 | 120 | 80 | 90 | 100 | 120 | 80 | 90 | 100 | 120 | 80 | 90 |
| 80 | 80 | 159 | | | 196 | 184 | | | 186 | 201 | | | 186 | 190 | |
| 80 | 90 | | 173 | | | | 192 | | | | 189 | | | | 193 |
| 80 | 100 | | | 166 | | | | 188 | | | | 175 | | | |
| 80 | 120 | 180 | | | 203 | | | | 213 | | | | 188 | | |
| 90 | 80 | 162 | | | | 180 | | | | | | | | | |
| 90 | 90 | | 175 | | | | 189 | | | | | | | | |
| 90 | 100 | | | 187 | | | | 207 | | | | | | | |
| 90 | 120 | 189 | | | 235 | | | | 227 | | | | | | |
| 100 | 80 | 179 | | | | | | | | 194 | | | | | |
| 100 | 90 | | 178 | | | | | | | | 176 | | | | |
| 100 | 100 | | | 190 | | | | | | | | 183 | | | |
| 100 | 120 | 169 | | | 210 | | | | | | | | 198 | | |
| 120 | 80 | 199 | | | | | | | | | | | | 217 | |
| 120 | 90 | | 198 | | | | | | | | | | | | 190 |
| 120 | 100 | | | 171 | | | | | | | | | | | |
| 120 | 120 | 148 | | | 194 | | | | | | | | | | |
| 140 | 80 | 162 | | | | | | | | | | | | | |
| 140 | 90 | | 172 | | | | | | | | | | | | |
| 140 | 100 | | | 158 | | | | | | | | | | | |
| 140 | 120 | 142 | | | 186 | | | | | | | | | | |
| 160 | 80 | 157 | | | | | | | | | | | | | |
| 160 | 90 | | 165 | | | | | | | | | | | | |
| 160 | 100 | | | 155 | | | | | | | | | | | |
| 160 | 120 | 133 | | | 162 | | | | | | | | | | |

TABLE 6-continued

| Pyramid apex angle (degree) of light diffusion sheet on light emitting side | Prism apex angle (degree) of light diffusion sheet on light emitting side | Pyramid apex angle (degree) of light diffusion sheet on light incident side | | | | | | | | | |
|---|---|---|---|---|---|---|---|---|---|---|---|
| | | 120 | 120 | 140 | 140 | 140 | 140 | 160 | 160 | 160 | 160 |
| | | Prism apex angle (degree) of light diffusion sheet on light incident side | | | | | | | | | |
| | | 100 | 120 | 80 | 90 | 100 | 120 | 80 | 90 | 100 | 120 |
| 80 | 80 | | 175 | 167 | | | 173 | 162 | | | 162 |
| 80 | 90 | | | | 175 | | | | 165 | | |
| 80 | 100 | 159 | | | | 164 | | | | 146 | |
| 80 | 120 | | 181 | | | | 188 | | | | 170 |
| 90 | 80 | | | | | | | | | | |
| 90 | 90 | | | | | | | | | | |
| 90 | 100 | | | | | | | | | | |
| 90 | 120 | | | | | | | | | | |
| 100 | 80 | | | | | | | | | | |
| 100 | 90 | | | | | | | | | | |
| 100 | 100 | | | | | | | | | | |
| 100 | 120 | | | | | | | | | | |
| 120 | 80 | | | | | | | | | | |
| 120 | 90 | | | | | | | | | | |
| 120 | 100 | 157 | | | | | | | | | |
| 120 | 120 | | 142 | | | | | | | | |
| 140 | 80 | | | 172 | | | | | | | |
| 140 | 90 | | | | 171 | | | | | | |
| 140 | 100 | | | | | 143 | | | | | |
| 140 | 120 | | | | | | 131 | | | | |
| 160 | 80 | | | | | | | 176 | | | |
| 160 | 90 | | | | | | | | 167 | | |
| 160 | 100 | | | | | | | | | 134 | |
| 160 | 120 | | | | | | | | | | 116 |

TABLE 7

| Pyramid apex angle (degree) of light diffusion sheet on light emitting side | Prism apex angle (degree) of light diffusion sheet on light emitting side | Pyramid apex angle (degree) of light diffusion sheet on light incident side | | | | | | | | | | | | |
|---|---|---|---|---|---|---|---|---|---|---|---|---|---|---|
| | | 80 | 80 | 80 | 80 | 90 | 90 | 90 | 90 | 100 | 100 | 100 | 100 | 120 |
| | | Prism apex angle (degree) of light diffusion sheet on light incident side | | | | | | | | | | | | |
| | | 80 | 90 | 100 | 120 | 80 | 90 | 100 | 120 | 80 | 90 | 100 | 120 | 80 |
| 80 | 80 | 3544 | | | 3625 | 3586 | | | 3654 | 3567 | | | 3660 | 3587 |
| 80 | 90 | | 3494 | | | | 3567 | | | | 3571 | | | |
| 80 | 100 | | | 3538 | | | | 3553 | | | | 3570 | | |
| 80 | 120 | 3609 | | | 3451 | | | | 3484 | | | | 3521 | |
| 90 | 80 | 3617 | | | | 3559 | | | | | | | | |
| 90 | 90 | | 3576 | | | | 3532 | | | | | | | |
| 90 | 100 | | | 3583 | | | | 3501 | | | | | | |
| 90 | 120 | 3614 | | | 3495 | | | | 3408 | | | | | |
| 100 | 80 | 3589 | | | | | | | | 3504 | | | | |
| 100 | 90 | | 3602 | | | | | | | | 3515 | | | |
| 100 | 100 | | | 3580 | | | | | | | | 3501 | | |
| 100 | 120 | 3639 | | | 3534 | | | | | | | | 3465 | |
| 120 | 80 | 3583 | | | | | | | | | | | | 3476 |
| 120 | 90 | | 3597 | | | | | | | | | | | |
| 120 | 100 | | | 3645 | | | | | | | | | | |
| 120 | 120 | 3722 | | | 3632 | | | | | | | | | |
| 140 | 80 | 3682 | | | | | | | | | | | | |
| 140 | 90 | | 3712 | | | | | | | | | | | |
| 140 | 100 | | | 3732 | | | | | | | | | | |
| 140 | 120 | 3809 | | | 3746 | | | | | | | | | |
| 160 | 80 | 3624 | | | | | | | | | | | | |
| 160 | 90 | | 3639 | | | | | | | | | | | |
| 160 | 100 | | | 3688 | | | | | | | | | | |
| 160 | 120 | 3803 | | | 3767 | | | | | | | | | |

TABLE 7-continued

| Pyramid apex angle (degree) of light diffusion sheet on light emitting side | Prism apex angle (degree) of light diffusion sheet on light emitting side | Pyramid apex angle (degree) of light diffusion sheet on light incident side | | | | | | | | | | |
|---|---|---|---|---|---|---|---|---|---|---|---|---|
| | | 120 | 120 | 120 | 140 | 140 | 140 | 140 | 160 | 160 | 160 | 160 |
| | | Prism apex angle (degree) of light diffusion sheet on light incident side | | | | | | | | | | |
| | | 90 | 100 | 120 | 80 | 90 | 100 | 120 | 80 | 90 | 100 | 120 |
| 80 | 80 | | | 3689 | 3667 | | | 3775 | 3631 | | | 3772 |
| 80 | 90 | 3578 | | | | 3686 | | | | 3612 | | |
| 80 | 100 | | 3616 | | | | 3686 | | | | 3664 | |
| 80 | 120 | | | 3583 | | | | 3682 | | | | 3705 |
| 90 | 80 | | | | | | | | | | | |
| 90 | 90 | | | | | | | | | | | |
| 90 | 100 | | | | | | | | | | | |
| 90 | 120 | | | | | | | | | | | |
| 100 | 80 | | | | | | | | | | | |
| 100 | 90 | | | | | | | | | | | |
| 100 | 100 | | | | | | | | | | | |
| 100 | 120 | | | | | | | | | | | |
| 120 | 80 | | | | | | | | | | | |
| 120 | 90 | 3476 | | | | | | | | | | |
| 120 | 100 | | 3574 | | | | | | | | | |
| 120 | 120 | | | 3626 | | | | | | | | |
| 140 | 80 | | | | 3641 | | | | | | | |
| 140 | 90 | | | | | 3792 | | | | | | |
| 140 | 100 | | | | | | 3716 | | | | | |
| 140 | 120 | | | | | | | 3843 | | | | |
| 160 | 80 | | | | | | | | 3500 | | | |
| 160 | 90 | | | | | | | | | 3487 | | |
| 160 | 100 | | | | | | | | | | 3590 | |
| 160 | 120 | | | | | | | | | | | 3855 |

As shown in Table 6 and Table 7, in the second example, the luminance exhibited a tendency similar to that of the third example shown in Table 5, but the in-plane luminance uniformity did not exhibit a tendency similar to that of the third example shown in Table 4.

Other Embodiments

The above describes embodiments (including examples; the same applies hereinafter) of the present disclosure. However, the present disclosure is not limited only to the aforementioned embodiments, and various modifications are possible within the scope of the disclosure. That is, the above description of the embodiments is solely to serve as an example in nature, and is not intended to limit the present disclosure, applications thereof, or uses thereof.

DESCRIPTION OF REFERENCE CHARACTERS

1 TFT Substrate
2 CF Substrate
3 Liquid Crystal Layer
5 Liquid Crystal Display Panel
6 First Polarizing Plate
7 Second Polarizing Plate
40 Backlight Unit
41 Reflective Sheet
42 Light Source
43 Light Diffusion Sheet (Lower Light Diffusion Sheet)
43*a* First Surface
43*b* Second Surface
44 Color Conversion Sheet
45 First Prism Sheet
46 Second Prism Sheet
47 Light Diffusion Sheet (Upper Light Diffusion Sheet)
50 Liquid Crystal Display Device
50*a* Display Screen
101 Base Material Layer
102 First Diffusion Layer
103 Second Diffusion Layer
105 Recess
106 Linear Structure

The invention claimed is:

1. A light diffusion sheet incorporated in a backlight unit having a prism sheet, the light diffusion sheet comprising a first surface to serve as a light emitting surface and a second surface to serve as a light incident surface, wherein the light diffusion sheet is disposed below the prism sheet in the backlight unit;

a plurality of recesses having a substantially inverted quadrangular pyramid shape are provided on one of the first surface and the second surface;

a plurality of linear structures extending in a predetermined direction are provided on another one of the first surface and the second surface; and an apex angle of the plurality of recesses is 100° or more, wherein each of the plurality of recesses has four sidewalls converging at a single apex point, and the plurality of recesses are arranged in a two-dimensional matrix without a gap therebetween.

2. The light diffusion sheet of claim 1, wherein the plurality of linear structures constitute a prism, a hairline, a lenticular, or a diffractive grating.

3. The light diffusion sheet of claim 1, wherein the plurality of linear structures constitute a prism with an apex angle of 95° or less; and the apex angle of the plurality of recesses is 110° or more and 130° or less.

4. The light diffusion sheet of claim 1, wherein the plurality of linear structures constitute a prism; and the apex angle of the plurality of recesses is 130° or more and 150° or less.

5. The light diffusion sheet of claim 1, wherein
an array direction of the plurality of recesses crosses the predetermined direction.

6. A backlight unit built in a liquid crystal display device and leading light rays emitted from a plurality of light sources toward a display screen, comprising:
the light diffusion sheet of claim 1 between the display screen and the plurality of light sources.

7. The backlight unit of claim 6, wherein
the plurality of light sources are arranged on a reflective sheet provided opposite to the display screen when viewed from the light diffusion sheet.

8. The backlight unit of claim 6, wherein
the light diffusion sheet includes a plurality of light diffusion sheets layered and placed between the display screen and the plurality of light sources.

9. The backlight unit of claim 8, wherein
the light diffusion sheet including the plurality of light diffusion sheets includes a first light diffusion sheet and a second light diffusion sheet; and
a direction in which the plurality of linear structures on the first light diffusion sheet extend crosses a direction in which the plurality of linear structures on the second light diffusion sheet extend.

10. The backlight unit of claim 6, further comprising:
another light diffusion sheet between the display screen and the light diffusion sheet, wherein
a plurality of other recesses having a substantially inverted quadrangular pyramid shape are provided on one surface of the other light diffusion sheet, and
the apex angle of the plurality of the other recesses are smaller than the apex angle of the plurality of recesses.

11. The backlight unit of claim 6, wherein
a distance between the plurality of light sources and the light diffusion sheet is 1 mm or less.

12. A liquid crystal display device, comprising:
the backlight unit of claim 6; and
a liquid crystal display panel.

13. An information device comprising the liquid crystal display device of claim 12.

14. The light diffusion sheet of claim 1, wherein
the light diffusion sheet is an independent sheet separate from the prism sheet, and the light diffusion sheet is not physically joined with the prism sheet.

15. The light diffusion sheet of claim 14, wherein
the plurality of recesses are provided on the first surface of the light diffusion sheet and the plurality of linear structures are provided on the second surface of the light diffusion sheet.

16. A light diffusion sheet incorporated in a backlight unit having a prism sheet, the light diffusion sheet comprising a first surface to serve as a light emitting surface and a second surface to serve as a light incident surface, wherein
the light diffusion sheet is disposed below the prism sheet in the backlight unit;
a plurality of recesses having a substantially inverted quadrangular pyramid shape are provided on one of the first surface and the second surface;
a plurality of linear structures extending in a predetermined direction are provided on another one of the first surface and the second surface;
the plurality of linear structures constitute a prism with an apex angle of 95° or more;
the apex angle of the plurality of recesses is 85° or more and 95° or less;
each of the plurality of recesses has four sidewalls converging at a single apex point; and
the plurality of recesses are arranged in a two-dimensional matrix without a gap therebetween.

17. A backlight unit built in a liquid crystal display device and leading light rays emitted from a plurality of light sources toward a display screen, comprising:
the light diffusion sheet of claim 16 between the display screen and the plurality of light sources.

18. The backlight unit of claim 17, wherein
the plurality of light sources are arranged on a reflective sheet provided opposite to the display screen when viewed from the light diffusion sheet.

19. The backlight unit of claim 17, wherein
the light diffusion sheet includes a plurality of light diffusion sheets layered and placed between the display screen and the plurality of light sources.

20. The backlight unit of claim 19, wherein
the light diffusion sheet including the plurality of light diffusion sheets includes a first light diffusion sheet and a second light diffusion sheet; and
a direction in which the plurality of linear structures on the first light diffusion sheet extend crosses a direction in which the plurality of linear structures on the second light diffusion sheet extend.

21. The backlight unit of claim 17, further comprising:
another light diffusion sheet between the display screen and the light diffusion sheet, wherein
a plurality of other recesses having a substantially inverted quadrangular pyramid shape are provided on one surface of the other light diffusion sheet, and
the apex angle of the plurality of the other recesses are smaller than the apex angle of the plurality of recesses.

22. The backlight unit of claim 17, wherein
a distance between the plurality of light sources and the light diffusion sheet is 1 mm or less.

23. A liquid crystal display device, comprising:
the backlight unit of claim 17; and
a liquid crystal display panel.

24. An information device comprising the liquid crystal display device of claim 23.

25. The light diffusion sheet of claim 16, wherein
the light diffusion sheet is an independent sheet separate from the prism sheet, and the light diffusion sheet is not physically joined with the prism sheet; and
the plurality of recesses are provided on the first surface of the light diffusion sheet and the plurality of linear structures are provided on the second surface of the light diffusion sheet.

26. The light diffusion sheet of claim 25, wherein
the plurality of recesses are provided on the first surface of the light diffusion sheet and the plurality of linear structures are provided on the second surface of the light diffusion sheet.

* * * * *